(12) United States Patent
Wergeland

(10) Patent No.: US 11,766,039 B2
(45) Date of Patent: Sep. 26, 2023

(54) FREEZING OF BIOLOGICAL MATERIAL

(71) Applicant: Sci-Group AS, Rud (NO)

(72) Inventor: Ivar Wergeland, Rud (NO)

(73) Assignee: Sci-Group AS, Rud (NO)

( * ) Notice: Subject to any disclaimer, the term of this patent is extended or adjusted under 35 U.S.C. 154(b) by 823 days.

(21) Appl. No.: 16/626,401

(22) PCT Filed: Jun. 27, 2018

(86) PCT No.: PCT/EP2018/067309
§ 371 (c)(1),
(2) Date: Dec. 24, 2019

(87) PCT Pub. No.: WO2019/002399
PCT Pub. Date: Jan. 3, 2019

(65) Prior Publication Data
US 2020/0154699 A1 May 21, 2020

(30) Foreign Application Priority Data

Jun. 28, 2017 (EP) .................................. 17178499

(51) Int. Cl.
*A01N 1/02* (2006.01)
(52) U.S. Cl.
CPC ......... *A01N 1/0284* (2013.01); *A01N 1/0221* (2013.01); *A01N 1/0252* (2013.01); *A01N 1/0294* (2013.01)
(58) Field of Classification Search
CPC .. A01N 1/0221; A01N 1/0252; A01N 1/0294; A01N 1/0284
See application file for complete search history.

(56) References Cited

U.S. PATENT DOCUMENTS

| 4,030,314 | A | 6/1977 | Strehler et al. |
| 4,490,982 | A | 1/1985 | Christmas |
| 4,537,034 | A * | 8/1985 | Crouch .................... A01N 1/02 62/62 |
| 7,418,823 | B2 | 9/2008 | Sato et al. |
| 7,810,340 | B2 * | 10/2010 | Owada ...................... A23L 3/32 62/410 |
| 8,028,532 | B2 * | 10/2011 | Voute ...................... A61J 1/165 62/66 |
| 8,127,559 | B2 | 3/2012 | Fujisaki et al. |
| 8,196,424 | B2 | 6/2012 | Kim et al. |
| 8,794,012 | B2 * | 8/2014 | Cheng ................... F25D 29/001 62/52.1 |

(Continued)

FOREIGN PATENT DOCUMENTS

| EP | 1135999 | 5/2007 |
| EP | 1867938 | 12/2007 |

(Continued)

OTHER PUBLICATIONS

Thurston et al.: "Post-thaw functional status . . . ", Theriogenology, Vo. 60, No. 1, Jun. 1, 2003, XP055405625.

(Continued)

*Primary Examiner* — Filip Zec
(74) *Attorney, Agent, or Firm* — RENNER KENNER GREIVE BOBAK TAYLOR & WEBER

(57) ABSTRACT

The present invention relates to a method of freezing of biological material and a freezing apparatus for freezing of biological material.

24 Claims, 24 Drawing Sheets

(56) References Cited

U.S. PATENT DOCUMENTS

| | | | | |
|---|---|---|---|---|
| 9,499,797 | B2* | 11/2016 | Yamanaka | C12N 5/0696 |
| 9,534,992 | B2* | 1/2017 | Schryver | A01N 1/0252 |
| 9,557,090 | B2* | 1/2017 | Katkov | A01N 1/0268 |
| 11,071,528 | B2* | 7/2021 | Erhardt | B01L 7/50 |
| 2005/0026133 | A1* | 2/2005 | Nakatsuji | A01N 1/02 |
| | | | | 435/2 |
| 2007/0259327 | A1* | 11/2007 | Iwanaga | A01N 1/02 |
| | | | | 435/1.1 |
| 2013/0183656 | A1* | 7/2013 | Lenz | C12N 5/061 |
| | | | | 435/351 |

FOREIGN PATENT DOCUMENTS

| | | |
|---|---|---|
| EP | 1447632 | 10/2011 |
| JP | 3074565 | 11/2000 |
| JP | 5439655 | 5/2014 |
| JP | 06323721 | 3/2020 |
| JP | 07265028 | 3/2020 |
| JP | 2001086967 | 3/2020 |
| JP | 2002333250 | 3/2020 |
| JP | 2005034089 | 3/2020 |
| WO | 9101635 | 2/1994 |
| WO | 9738092 | 10/1997 |
| WO | 9924045 | 5/1999 |
| WO | 2013096533 | 6/2013 |
| WO | 2015017221 | 2/2015 |
| WO | 2015089112 | 6/2015 |

OTHER PUBLICATIONS

Hoffmann et al.: "Optimization of Cooling protocol . . . ", Annual Report 2005, Jan. 1, 2006, pp. 1-2, XP055405119.

Chun-Yen Lin et al.: "Slow Freezing Coupled Static Magnetic ( . . . )", Plos One, XP 055495725.

Yi-June Lo et al. "Static magnetic field . . . ", J. Med. Biol. Eng., XP 9507063.

Nishiyama Yuichiro et al.: "Safe and efficient method for cryopreservation . . . ", Neuroscience Research, XP 029553078.

Laura Otero et al.: "Effects of Magnetic Fields on Freezing . . . ", Comprehensive Review in Food Science and Food Safety, XP 55495395.

"Operation Manual IceCube 14S Val", Jan. 1, 2004, pp. 1-108, XP055406216.

\* cited by examiner

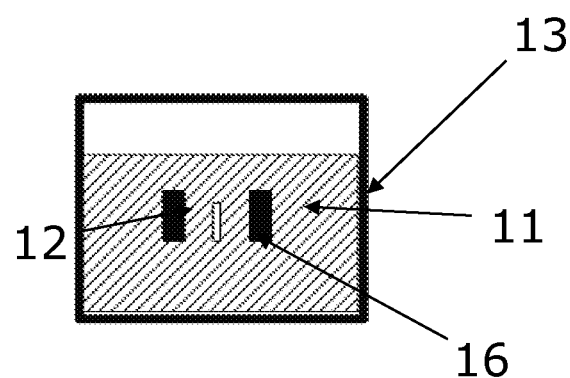
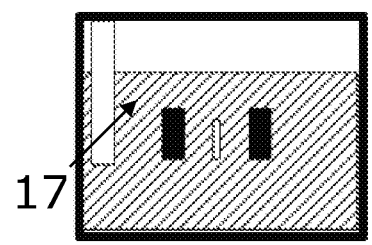
Fig. 9A          Fig. 9B
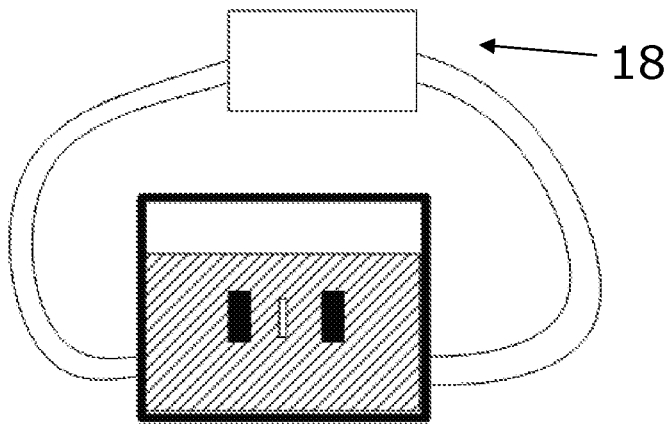
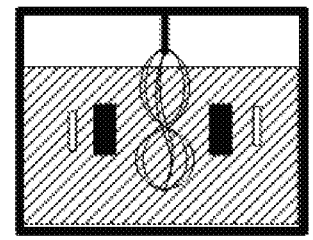
Fig. 9C          Fig. 9D

FREEZING OF BIOLOGICAL MATERIAL

FIELD OF THE INVENTION

The present invention relates to a method of freezing of biological material and a freezing apparatus for freezing of biological material.

BACKGROUND OF THE INVENTION

Cryopreservation of biological material such as e.g. cells, tissue, organs, blood products, embryos, sperm, stem cells, fish eggs, etc., entails freezing a biological material to low enough temperatures, such that chemical processes, which might otherwise damage the material are halted thereby preserving the material.

The field of cryopreservation often aims to not only freeze the biological materials, but also to retain their viability, i.e. their ability to resume normal biological function after thawing. When freezing a biological material the fluid inside will undergo a phase transition during which ice crystals may form. The formation of ice crystals can cause damage to the biological material, such that it may not be viable after thawing.

A common procedure in cryopreservation is the utilization of so-called cryoprotectants such as e.g. DMSO (Dimethyl sulfoxide, $(CH_3)_2SO$)), glycerol and various alcohols. Cryoprotectants are substances which protect biological materials during freezing by reducing ice crystal formation. However, many of the cryoprotectants used are inherently toxic to the biological material and need to be removed immediately after thawing of the biological material. It would therefore be preferable to cryopreserve without the addition of cryoprotectants or, alternatively, with less amount of cryoprotectant.

One type of standard protocol used in a cell laboratory prescribes placing the cryo-tubes with cell suspensions containing DMSO into an ordinary freezer, e.g. a $-20°$ C. freezer, for a period, e.g. 30 minutes. Thereafter, the samples are placed in a $-80°$ C. freezer or in a container with dry ice for a period, e.g. 45 minutes, before the samples are finally inserted in a locator with liquid nitrogen for permanent storage. This procedure is largely developed empirically and used with minor modifications in different laboratories doing in vitro research. The method results in acceptable cell recovery as long as DMSO is removed quickly after thawing as it will otherwise damage the cells. Alternatively the cryoprotectant concentration is reduced to a less harmful level when growth medium is added after thawing.

An alternative to placing samples in an ordinary freezer is to make use of a controlled rate freezer, which can be set to control the cooling rate based on the temperature inside the freezer. Using such a device a freezing rate of $-1°$ C./min is often recommended. Cryopreservation of biological material in a controlled rate freezer also entails the use of cryoprotectants as a standard.

An important factor in designing the standard protocols for cryopreservation is the viability, i.e. how much of the biological material is viable after thawing.

An improved method of cryopreservation, which results in tolerable viability-would be advantageous, and in particular a method whereby cryoprotectants are not needed to achieve tolerable viability would be advantageous.

When liquid water is cooled it undergoes a phase transition from liquid to solid at a critical temperature. The phase transition is a first-order transition, which means the water either absorbs or releases an amount of energy per volume known as the latent heat. During the phase transition the temperature of the water will remain constant as heat is added or removed and during this time the water is in a mixed-state, where some of it is in a liquid state and some is in a solid state. The temperature at which a phase transition happens can be called the critical temperature of the phase transition. When water is cooled the temperature of the water decreases until the critical temperature is reached. While cooling is still applied the temperature of the water remains constant until the latent heat has been removed from the water after which the temperature of the water, now in solid state, once again decreases. This means that there is a duration of time during which latent heat is being removed from the water.

The inventor has noted that the duration of latent heat removal during freezing is an important factor in cryopreservation. The time during which latent heat is removed in the process of freezing is the time when ice crystals may form. When standard cryopreservation protocols such as the ones described above are used the inventor has noted that the duration of latent heat removal is of the order of 20 minutes. It is noted that a shorter duration of latent heat removal is preferable to obtain higher viability of biological material, which has been frozen.

In WO 91/01635 a shorter duration of latent heat removal is also preferred. The document discloses a method, where different heat extraction rates are used; one rate is used while latent heat is being lost, while a second, and smaller, rate is used either when the temperature of the material starts to drop again, i.e. after the latent heat has been removed, or while latent heat is still being removed. In the disclosed invention cryoprotectants are used as standard.

Several interesting experiments have been carried out by the inventor. For example, experiments carried out on two types of mammalian cells where the effect of reducing the duration of latent heat removal on viability was tested. The first experiment found a 1000-fold increase in cell survival determined by colony formation after freezing one type of live cells in absence of a cryoprotectant when the latent heat was removed in 4 minutes compared to when it was removed in 20 minutes. The second experiment found a pronounced increase in plating efficiency after thawing for both cell types tested if the ice-forming time was halved from about 6 min to about 3 min and as long as no DMSO was present. The plating efficiency for both cells having been frozen with an ice-forming time of 2 minutes and 3 minutes was close to that found for samples cooled with 5% DMSO for 30 min in $-20$ C then 45 min in $\sim -80$ C and final storage in liquid N2, which is one of the standard laboratory freezing procedures used today.

OBJECT OF THE INVENTION

It may be seen as an object of the invention to provide a method to freeze or cryopreserve biological material, preferably human or animal cells.

It may be seen as another object of the invention to provide an apparatus for freezing or cryopreservation of biological material, preferably human or animal cells.

It is an object of the present invention to wholly or partly overcome the above disadvantages and drawbacks of the prior art.

An object of the present invention is to provide an alternative to the prior art.

SUMMARY OF THE INVENTION

Thus, the above described object and several other objects are intended to be obtained in a first aspect of the invention by providing a method to freeze or cryopreserve human and/or animal cells in suspension or attached to a surface, wherein one or more samples of human and/or animal cells in suspension or attached to a surface contained in container(s) comprise one or more liquids, the method comprising:

determining the cooling needed such that the phase transition time of a calibration sample contained in a container is less than 12 minutes;

cooling said one or more samples in the same manner as said calibration sample.

Human or animal cells includes, but is not limited to: human or animal cells, cell lines, primary cells, stem cells, blood products, such as blood cells, tissue cells, embryos, sperm, and fish eggs.

The human or animal cells (in suspension) will in this document interchangeably be referred to as biological samples or biological material.

Further biological material, which could be frozen using the method or apparatus disclosed herein, includes, but is not limited to: organs, viruses, bacteria and other biological materials in general.

Determining the cooling needed means determining a cooling profile, i.e. determining one or more parameters of cooling such as, but not limited to, cooling rate, cooling power, starting temperatures, hold times, and other parameters known when cooling.

Cooling in the same manner means using the determined cooling profile.

The phase transition time will in this document interchangeably be referred to as the latent heat removal time or ice-forming time.

The suspension is a liquid solution comprising the animal or human cells, where the cells represent a very small fraction of the total volume of the suspension. The number of cells per millilitre in the suspension is preferably in the range 60,000-100,000,000 cells/ml.

BRIEF DESCRIPTION OF THE FIGURES

The present invention and preferred embodiments thereof will now be described in more detail with regard to the accompanying figures. The figures show ways of implementing the present invention and are not to be construed as being limiting to other possible embodiments falling within the scope of the attached claim set.

FIG. 9A is an illustration of a cooling device comprising a cooling bath.

FIG. 9B is an illustration of another cooling device comprising a cooling bath and further comprising a cooling rod.

FIG. 9C is an illustration of another cooling device comprising a cooling bath and further comprising a bath circulator.

FIG. 9D is an illustration of a cooling device comprising a cooling bath and further comprising a stirring member.

DETAILED DESCRIPTION OF PREFERRED EMBODIMENT

Thus, the above described object and several other objects are intended to be obtained in a first aspect of the invention by providing a method of freezing a biological sample, the method comprising controlling the phase transition time of the one or more liquids of a biological sample.

In the case where the phase change from liquid to solid phase of the one or more liquids of the biological sample to be frozen is not detectable, the time interval of the phase transition is that of a suitable calibration sample such as e.g. an isotonic saline solution. An isotonic saline solution, also referred to as physiological saline or normal saline, contains 9 grams of NaCl dissolved in water to a total volume of 1000 ml, i.e. it is a solution of 0.90% w/v of NaCl.

An alternative calibration sample is the cryopreservation medium or growth medium, containing serum or being serum-free.

Another alternative calibration sample is one or more of the biological samples to be frozen by introduction of a (sterile) temperature sensor directly to the sample to be frozen.

The time interval of the phase transition may then be calibrated by measuring the temperature of a suitable calibration sample in a container, while the container is being cooled. The time interval is then determined according to a definition of the phase transition time.

Figure 1:
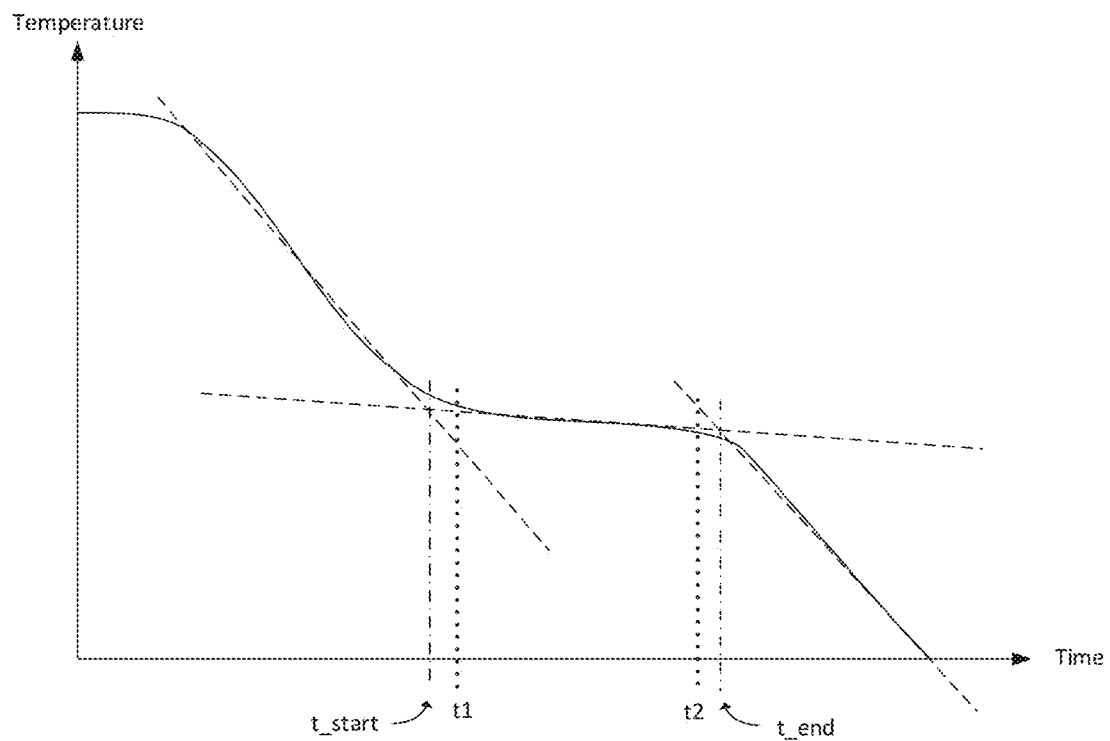
FIG. 1 is a graph showing a typical cooling curve for water. Sections of the curve is fitted with straight lines and demonstrate a method to determine the phase transition time, which is detailed in the description.

A (first) method to define the phase transition time is given below and with reference to FIG. 1, which shows a typical cooling curve (solid line) for an isotonic saline solution that is cooled at a cooling rate that is close to constant:
1. Fit a straight line to the part of the cooling curve, where the temperature is falling/decreasing, in a time interval before the curve flattens out due to the latent heat of fusion (dashed line in FIG. 1). The data set to fit the straight line to may be defined by changes in the first and/or second derivatives of the cooling curve.
2. Define t_start as the time, where the temperature data points close to the freezing point deviate from the straight line fitted in 1) by 0.5 degrees Celsius (dash-dotted line in FIG. 1).
3. Fit a straight line to the part of the cooling curve, where the temperature is falling/decreasing, in a time interval after the curve flattens out due to the latent heat of fusion (dashed line in FIG. 1). The data set to fit the straight line to may be defined by changes in the first and/or second derivatives of the cooling curve.
4. Define t_end as the time, where the temperature data points close to the freezing point deviate from the straight line fitted in 3) by 0.5 degrees Celsius (dash-dotted line in FIG. 1).
5. Fit a straight line to the temperature data in the time interval between t_start and t_end.
6. Define t1 as the time closest to t_start, where the temperature data points deviate from the straight line fitted in 5) by 0.25 degrees Celsius and t2 as as the time closest to t_end, where the temperature data points deviate from the straight line fitted in 5) by 0.25 degrees Celsius (dotted lines in FIG. 1).
7. The phase transition time or time of latent heat removal is then the time interval between t1 and t2.

In the above outlined method, any spurious data points may be disregarded in the process of defining t_start, t_end, t1 and t2.

Figure 11:
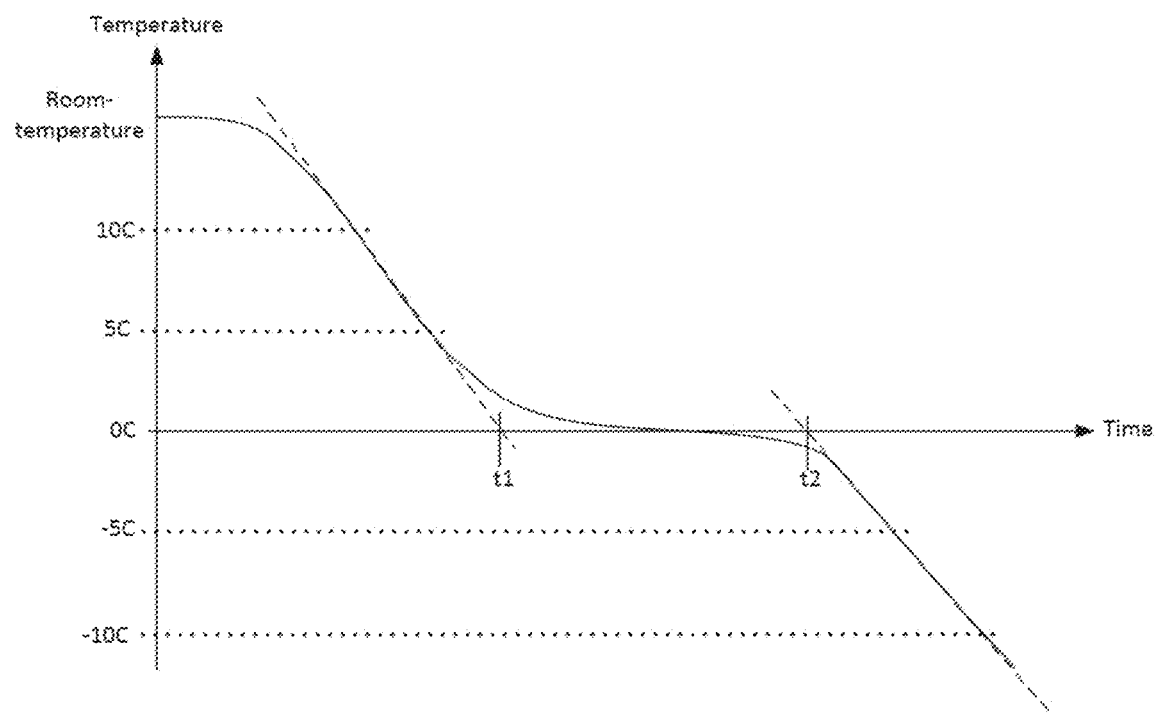
FIG. 11 is a graph showing a typical cooling curve for water and demonstrates a method to determine the phase transition time, which is detailed in the description.

Another, second, method to define the phase transition time is given below and with reference to FIG. 11:
1. Determine the straight line that goes through the data points with temperature values 5 C and 10 C and determine the straight line that goes through the data points with temperature values −5 C and −10 C.
2. Determine the values on the abscissa, where the lines found in step 1, cross, i.e. the points (t1, 0 C) and (t2, 0 C).
3. The phase transition time or time of latent heat removal is then the time interval between t1 and t2.

Cooling may comprise cooling from room temperature to a lower temperature, such as 5 C, 4 C, 3 C, 2 C or 1 C, and staying at this temperature, T_lower, for a period of time. In this case the first method to define the phase transition time described above can still be used. However, the second method described may only be used to determine t2. The value of t1 may be determined by determining a straight line that goes through a temperature lower than T_lower and a temperature higher than 0 C and then following steps 2 and 3 in the second method.

Figure 12:
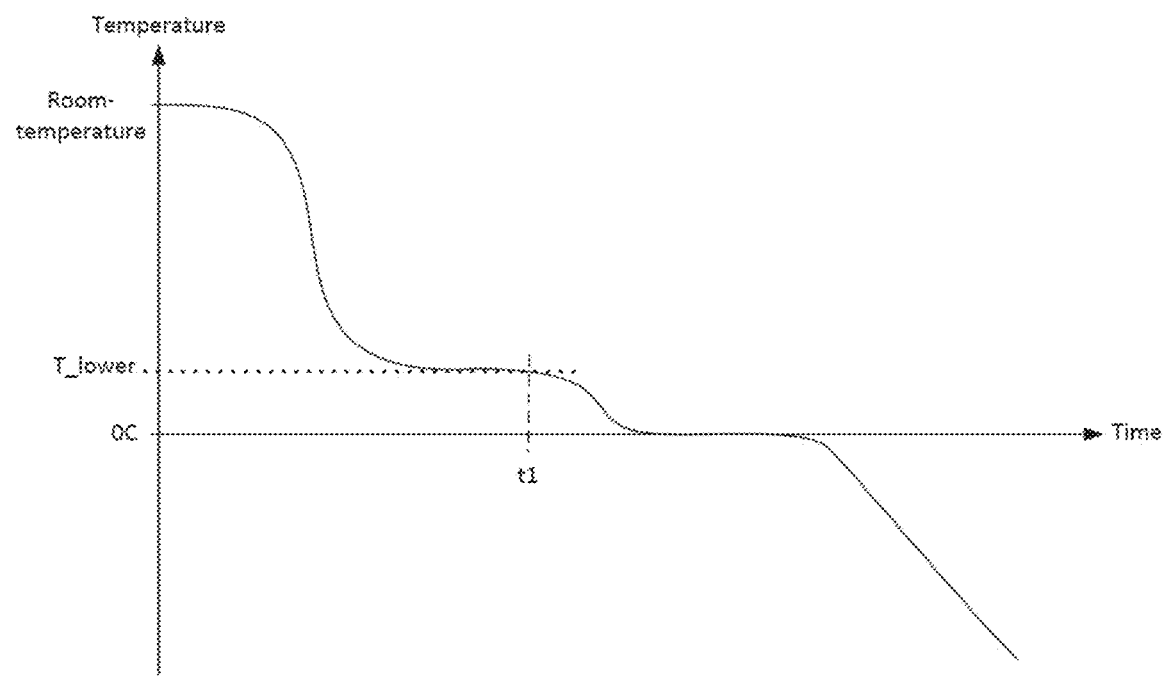
FIG. 12 is a graph showing a typical cooling curve for water and demonstrates a method to determine the phase transition time, which is detailed in the description.
Figure 13:
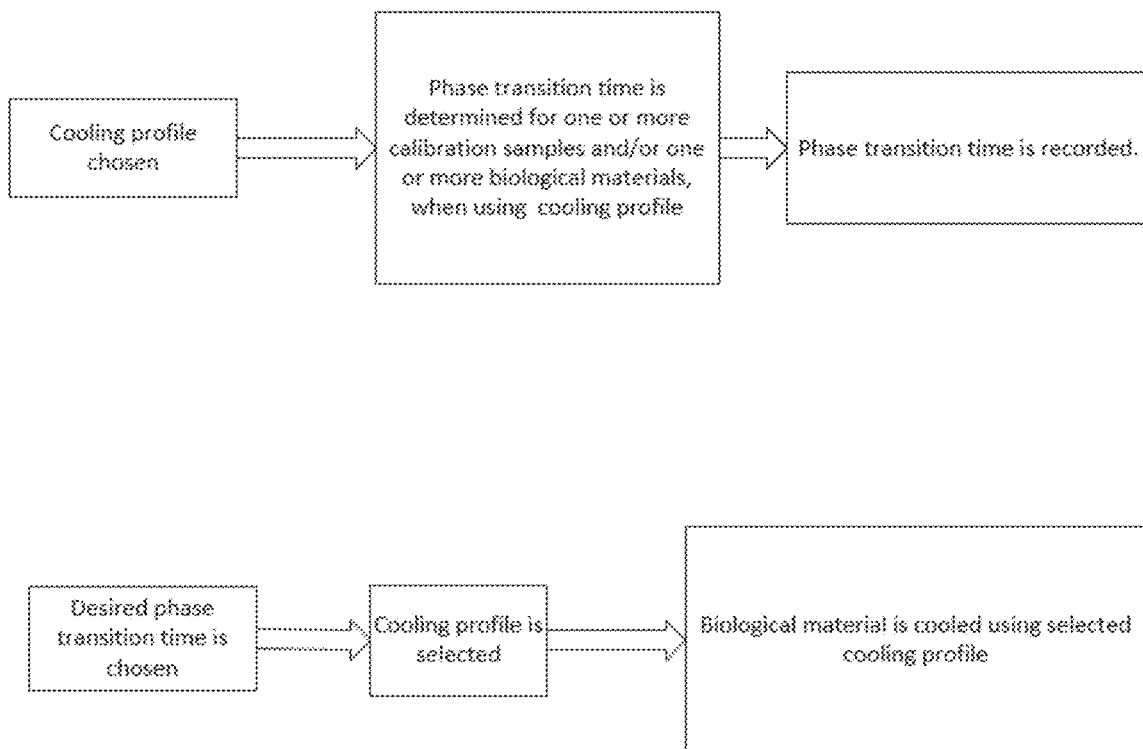
FIG. 13 is a flow-chart of a method according to the invention.

Another, fourth, method to define the phase transition time, when cooling to T_lower before further cooling, is given below and with reference to FIG. 12:
1. t1 is defined as the time, when the heat removal is increased such that the measured temperature decreases.
2. t2 is determined by using the relevant steps in the first or second method outlined above.
3. The phase transition time or time of latent heat removal is then the time interval between t1 and t2.

The cooling curve of more than one calibration sample may be measured. If so, the ice-forming time may be calculated as the mean of these measurements.

As the latent heat is a material constant given in energy per volume the amount of heat to be removed during the phase transition is dependent on the volume of the material. Further, the shape of the material will influence the heat removal. Also, containers, which have one or more dimensions that can be considered small are preferred as the temperature gradient across such a dimension will be smaller and thus less significant.

The biological material to be frozen may be in a container or on a carrier of some sort. Containers may include e.g. tubes, straws, bags, and ampoules. A suitable container and/or calibration sample should be chosen with regard to the sample of biological material to be frozen.

How the cooling power is achieved is not central to the method. A preferred feature is that the cooling capacity can be controlled in some manner such that the phase transition time can be regulated. By cooling calibration samples in different systems and altering the cooling capacity, a catalogue of phase transition time intervals can be made for each system. By cooling one or more biological samples at the same time as one or more calibration samples, it is possible to determine both a latent heat removal time and a viability for the biological samples.

Thus, biological materials may be frozen using an improved method by cooling the biological material 12 in a manner where the calibration sample 11 is defined to have changed from liquid to solid phase in a phase transition time being less than 12 minutes.

In an embodiment, the calibration sample 11 is defined to have changed from liquid to solid phase in a phase transition time being less than 6 minutes. That is, the biological material is cooled using a cooling profile, which results in a calibration sample having changed from liquid to solid phase in a phase transition time being less than 6 minutes.

In an embodiment, the calibration sample 11 is defined to have changed from liquid to solid phase in a phase transition time being less than 3 minutes. That is, the biological material is cooled using a cooling profile, which results in a calibration sample having changed from liquid to solid phase in a phase transition time being less than 3 minutes.

In an embodiment, the method is characterized in that a cryoprotectant is not added to the container 1 containing the biological material 12.

In another embodiment, the method of freezing biological material comprises adding a small amount of cryoprotectant to the container 1 containing the biological material 12.

In an embodiment, the small amount of cryoprotectant added to the container 1 constitutes preferably 15% or less of the total sample volume, such as 10% or less or such as 5% or less, such as 4% or less, such as 3% or less, such as 2% or less or such as 1% or less.

In an embodiment, the method of freezing biological material comprises the use of synthetic medium free from serum.

In an embodiment, the method of freezing biological material comprises thawing said biological material by applying one of the above described methods in reverse yielding a thawing time equivalent to the preferred latent heat removal time.

In another embodiment, the method of freezing biological material comprises thawing said biological material by applying any standard procedure for thawing of the biological material.

In a second aspect, the invention provides an apparatus for freezing a biological material.

In an embodiment, the apparatus for freezing of biological material comprises a cooling system and a system to control the cooling power.

In an embodiment the cooling system comprises a freezer, such as e.g. a vapor-compression freezer.

In an embodiment, the control of the cooling power comprises a means for setting a time, wherein the time set is the duration of latent heat removal from a calibration sample.

In an embodiment, the calibration sample comprises an isotonic saline solution.

In another embodiment, the calibration sample comprises a solution comprising growth medium with serum.

In another embodiment, the calibration sample comprises a solution comprising growth medium without serum.

In a further embodiment, the calibration sample is one or more of the biological samples to be frozen.

Figure 2:
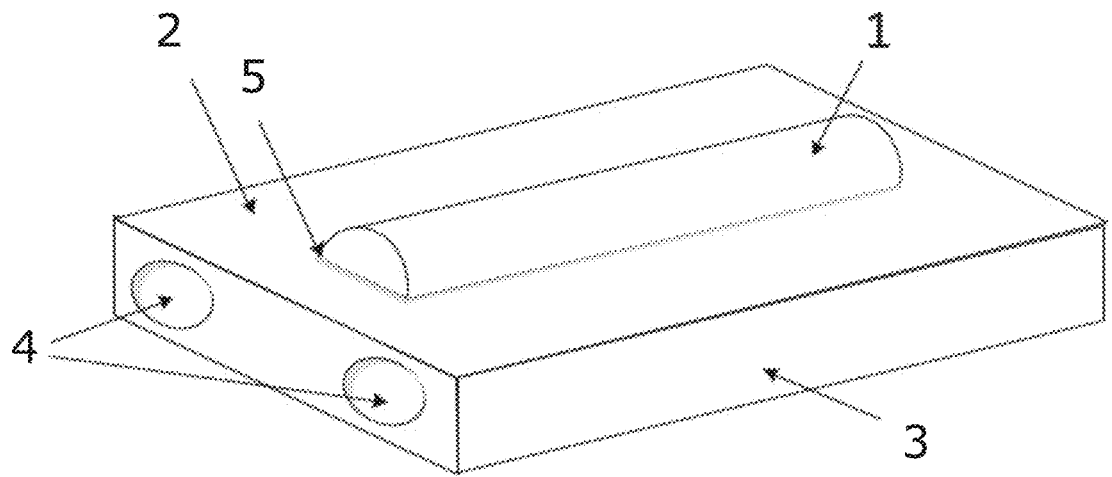
FIG. 2 is an illustration of a cooling plate with a sample to be cooled.
Figure 3:
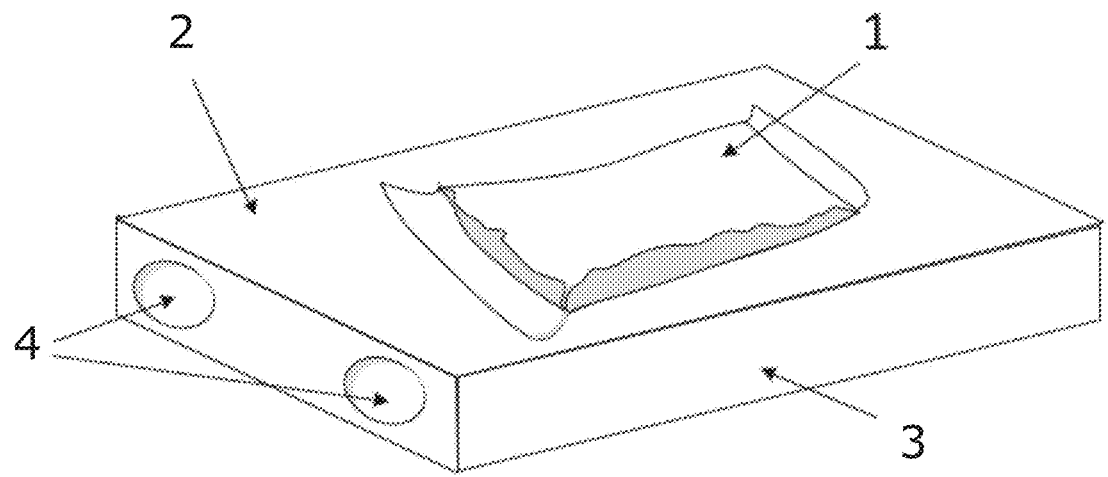
FIG. 3 is an illustration of a cooling plate with another sample to be cooled.

In FIGS. 2 and 3 is shown an embodiment, where the apparatus for freezing a biological material comprises a first plate member 2.

In an embodiment, with reference to FIGS. 2 and 3, the first plate member 2 can hold one or more calibration samples 11 and/or one or more biological samples 12 and/or one or more sample containers 1 containing biological material.

In another embodiment, with reference to FIGS. 2 and 3, the first plate member 2 may be made entirely of a heat conductive material or may comprise a heat conductive material, where the heat conductive material may cover only part of the first plate member 2.

In an embodiment, with reference to FIGS. 2 and 3, the first plate member 2 can be cooled by being in thermal contact with a cooling system such as e.g. a cooling fluid. Such a cooling fluid may stream through the first plate member 2 or in a construct 3, which is in thermal contact with the first plate member 2, via openings 4 in the first plate member 2 or construct 3.

In an embodiment, with reference to FIGS. 2 and 3, some of the dimensions of the first plate member 2 is 10 cm by 10 cm or 20 cm by 20 cm or larger.

In an embodiment, with reference to FIGS. 2 and 3, the construct 3 preferably comprises a thermally insulating material on one or more of the surfaces not in contact with the sample containers 1 or the biological material.

In an embodiment, with reference to FIGS. 2 and 3, a lid may be placed on top of the one or more biological samples or sample containers containing biological material. Such a lid could comprise a thin metal plate, such as stainless steel, aluminium or copper plate or composite material coated with a thermally insulating material such as a plastic material, such as e.g. a foam plastic material. By placing the lid with the thermally insulating material in contact with the sample or sample container, the biological sample or sample container may come into better thermal contact with the first plate member 2.

Figure 4:
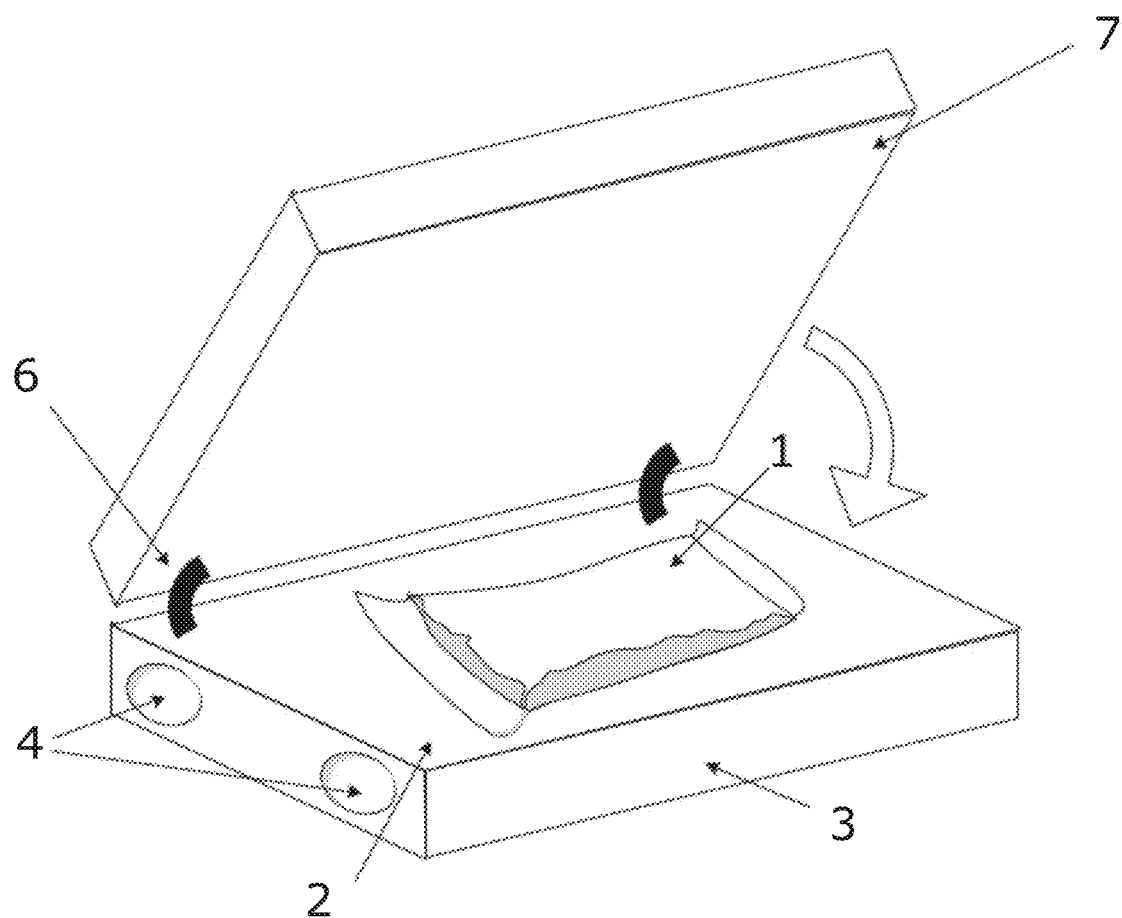
FIG. 4 is an illustration of a cooling device comprising two plates, which can close on each other.

In FIG. 4 is shown an embodiment, wherein the apparatus further comprises a second plate member 7.

In an embodiment, with reference to FIG. 4, the second plate member 7 is in thermal contact with the cooling system.

In an embodiment, with reference to FIG. 4, the second plate member 7 comprises openings 4 through which a cooling fluid may flow.

In an embodiment, with reference to FIG. 4, the temperature of the cooling fluid streaming through the first plate member 2 or the construct 3 and/or the second plate member 7 is between −100 C and +20 C.

In an embodiment, with reference to FIG. 4, the second plate member 7 may be made entirely of a heat conductive material or may comprise a heat conductive material, where the heat conductive material may cover only part of the second plate member 7.

Figure 5:
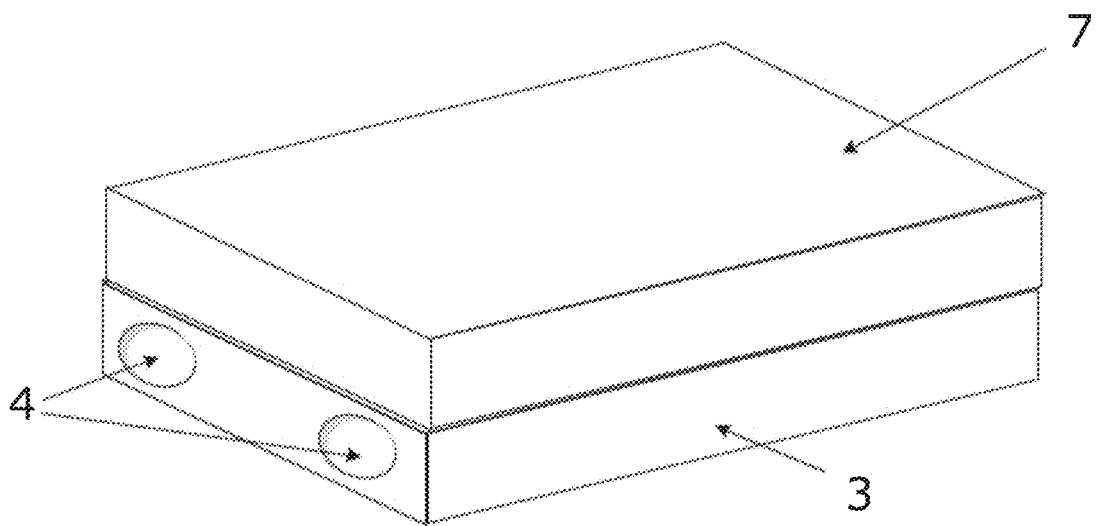
FIG. 5 is an illustration of the cooling device in FIG. 4, where the plates are closed on each other.

With reference to FIGS. 4 and 5, in an embodiment the first plate member 2 or a part of the construct 3 is mounted on one or more hinges 6 such that the second plate member 7, which is also mounted on the hinge 6, can close on it. Alternatively, the second plate member 7 is part of a member, which is mounted on the hinge 6, such that the second plate member 7 can close on the first plate member 2.

Figure 6A:
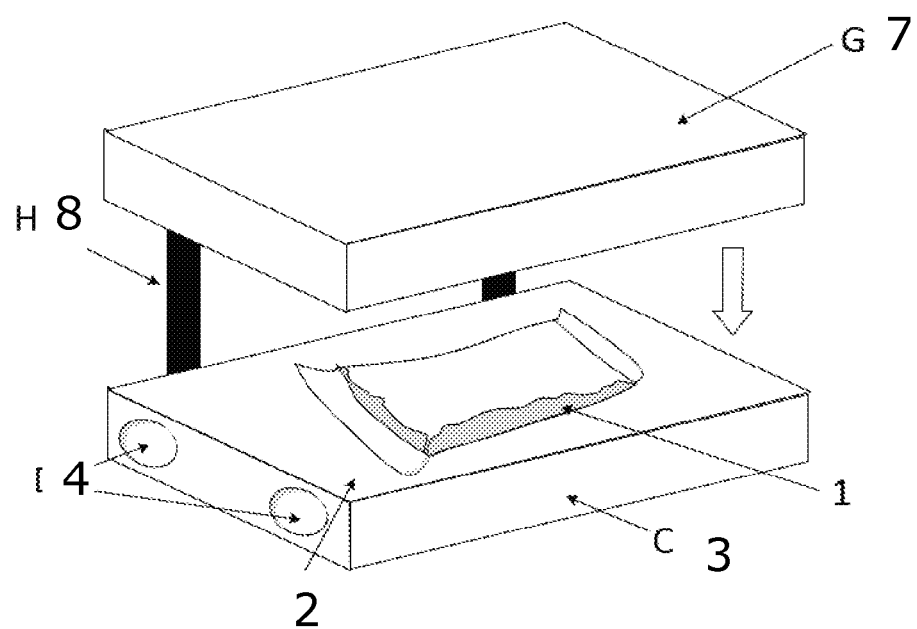
FIG. 6A is an illustration of another cooling device comprising two plates, which can close on each other.
Figure 6B:
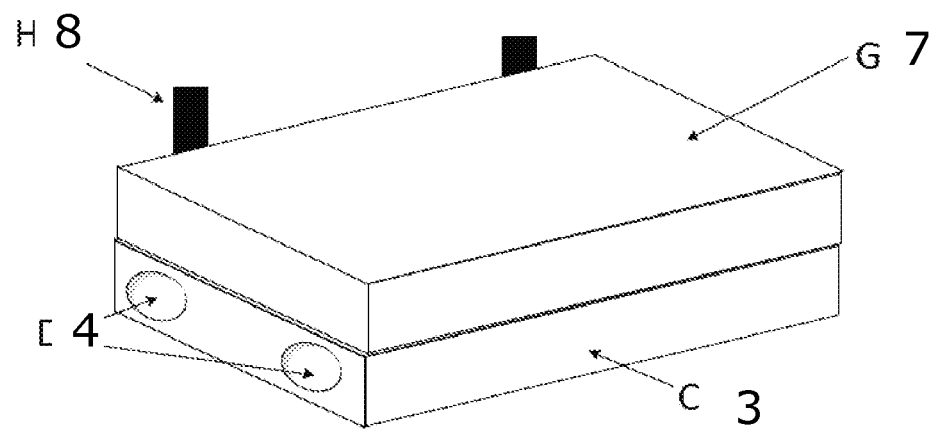
FIG. 6B is an illustration of the cooling device in FIG. 6A, where the plates are closed on each other.

With reference to FIGS. 6A and 6B, in another embodiment the first plate member 2 may be mounted on one or more closing aggregates 8 such that a second plate member 7, which is also mounted the closing aggregates 8 can close on the plate member 2 by one or both of the plates moving in a direction that is perpendicular to a plane defined by the plates.

Figure 7:
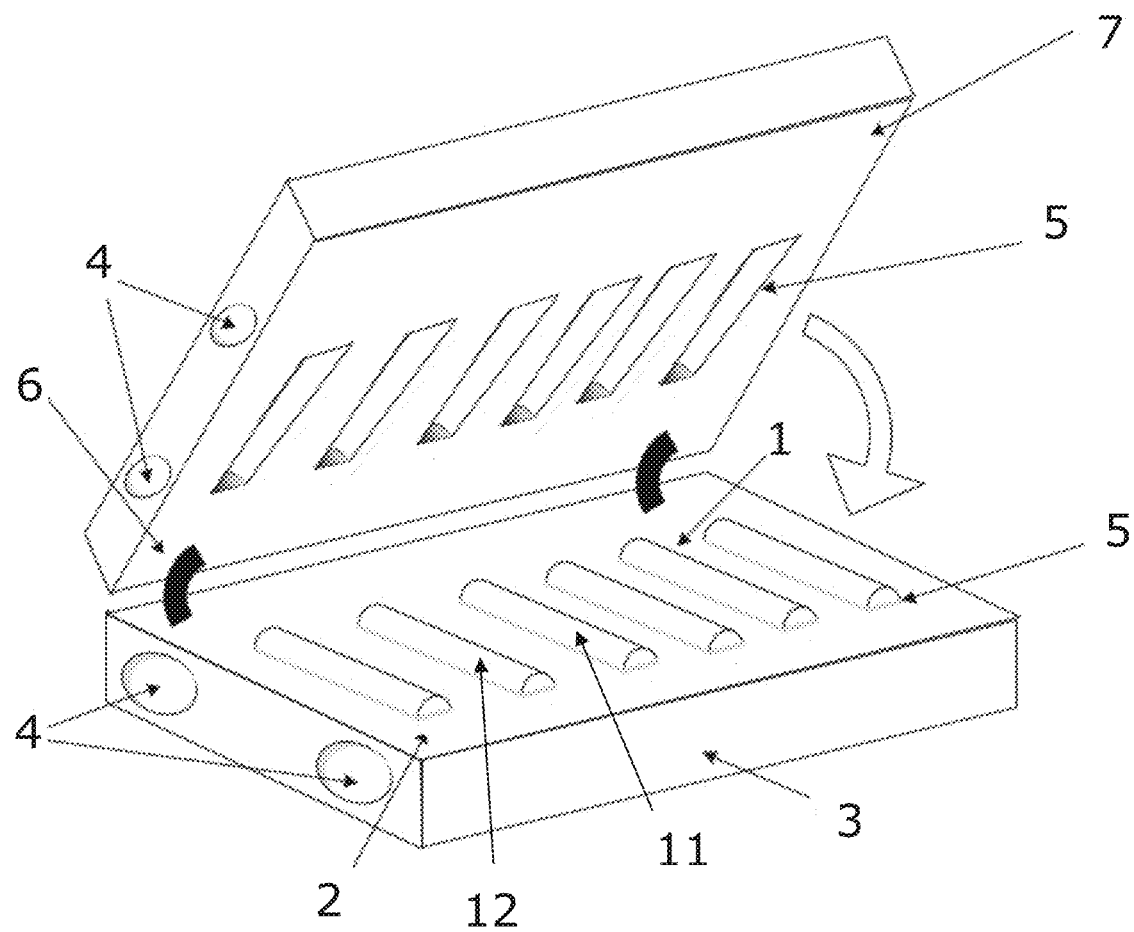
FIG. 7 is an illustration of a cooling device comprising plates that have indentations for samples to be cooled.

With reference to FIG. 7, in another embodiment the first plate member 2 has one or more indentations 5 to accommodate one or more calibration samples 11 and/or one or more biological samples 12 and/or one or more sample containers 1 containing biological material.

In an embodiment, with reference to FIG. 7, the second plate member 7 may have one or more indentations 5 to accommodate one or more calibration samples 11 and/or one or more biological samples 12 and/or one or more sample containers 1 containing biological material.

In an embodiment, with reference to FIG. 7, the dimensions of the indentations 5 may be such that when a biological sample or a sample container containing biological material or a calibration sample is placed in the indentations they are not wholly contained within the indentation in the first plate member 2, i.e. they extend through a plane defined by an upper surface of the first plate member 2 when disregarding the indentations 5.

In an embodiment, with reference to FIG. 7, the dimensions of the indentations 5 may be such that when a biological sample or a sample container containing biological material or a calibration sample is placed in the indentations 5 they are contained wholly within the indentation in the first plate member 2, i.e. they do not extend through a plane defined by an upper surface of the first plate member 2 when disregarding the indentations 5.

In an embodiment with reference to FIG. 7, the first plate member 2 and/or second plate member 7 comprises one or more changeable inserts. The inserts may be flat or comprise indentations 5 of various sizes and shapes. Such inserts may accommodate different sizes and shapes of objects to be frozen.

Figure 8:
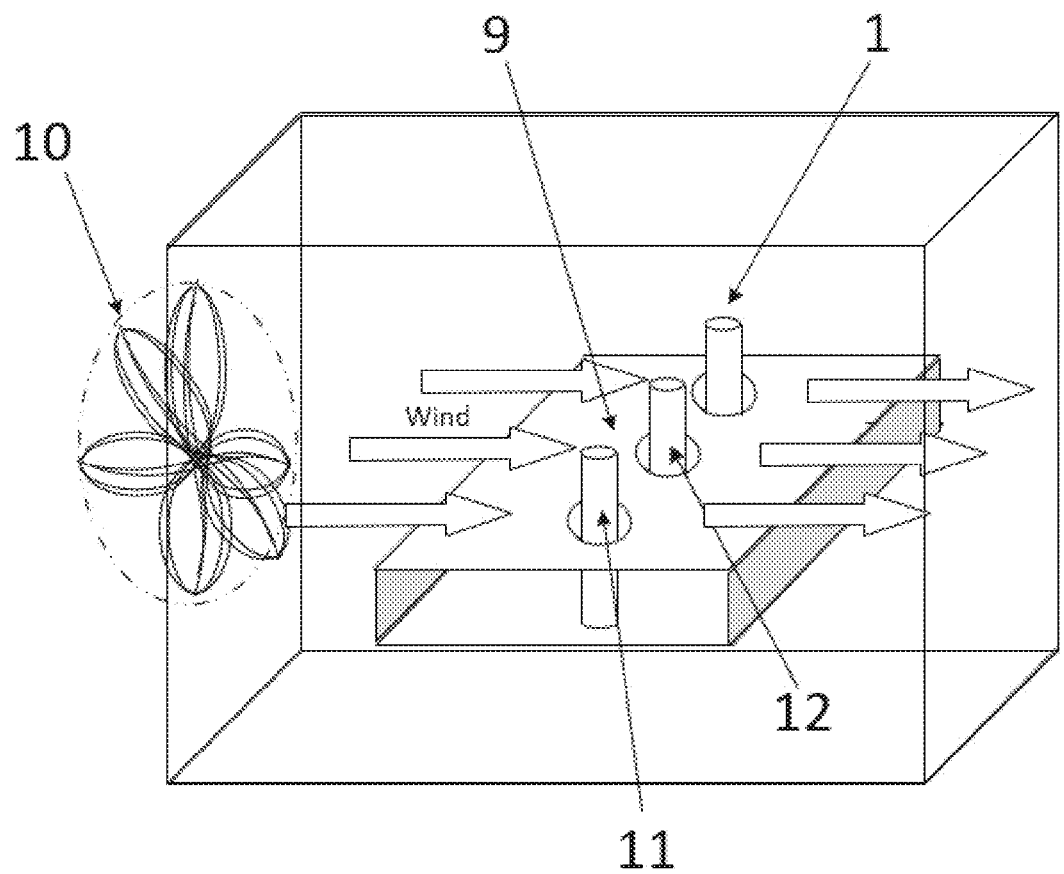
FIG. 8 is an illustration of a cooling device comprising a wind-generating member.

In FIG. 8 is shown an embodiment, where the apparatus for freezing a biological material comprises a wind-generating member 10, which can supply cooling.

In an embodiment, with reference to FIG. 8, the apparatus comprising a wind-generating member 10 further comprises a sample holder 9 for holding one or more calibration samples 11 and/or one or more biological samples 12 and/or one or more sample containers 1 containing biological material.

In a further embodiment, with reference to FIG. 8, the wind speed supplied by the wind-generating member 10 is regulated in the interval between 0.0 m/s-50 m/s, preferably in the interval between 0.1 m/s-50 m/s.

In FIG. 9A is shown an embodiment, where the apparatus for freezing a biological material comprises a cooling bath 13.

In an embodiment, with reference to FIG. 9A, the cooling bath 13 is used to cool one or more calibration samples 11 and/or one or more biological samples 12 and/or one or more sample containers 1 containing biological material.

In an embodiment, with reference to FIG. 9A, the cooling bath 13 further comprises a thermometer 16 for measuring the temperature of the cooling bath 13.

In FIG. 9B is shown an embodiment comprising a cooling bath and further comprising a cooling rod 17, which is used for cooling the cooling bath.

In FIG. 9C is shown an embodiment comprising a cooling bath and further comprising a bath circulator 18 for circulation of cooling fluid.

In FIG. 9D is shown an embodiment comprising a cooling bath and further comprising a stirring member 19.

Figure 10:
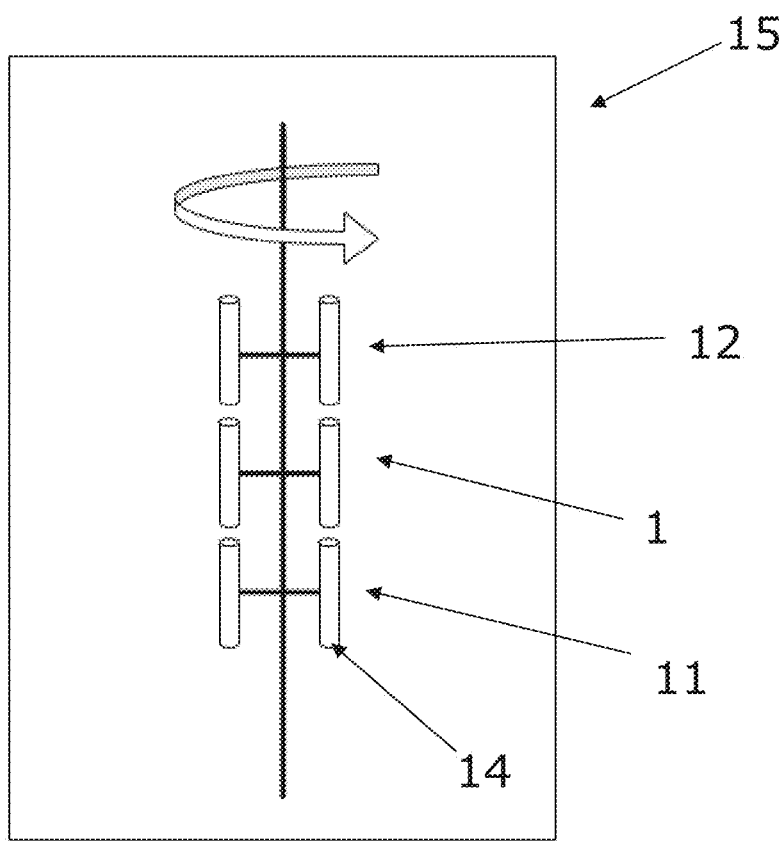
FIG. 10 is an illustration of a cooling device comprising a rotating sample rack.

In FIG. 10 is shown an embodiment, where one or more containers 1 are placed on a rotating holder or rack 14 to be cooled by a cooling device 15. The one or more containers 1 may be e.g. cryo-tubes or plastic bags, but are not limited thereto. The rotating holder or rack 14 is preferably suited for the particular type of sample.

Figure 14:
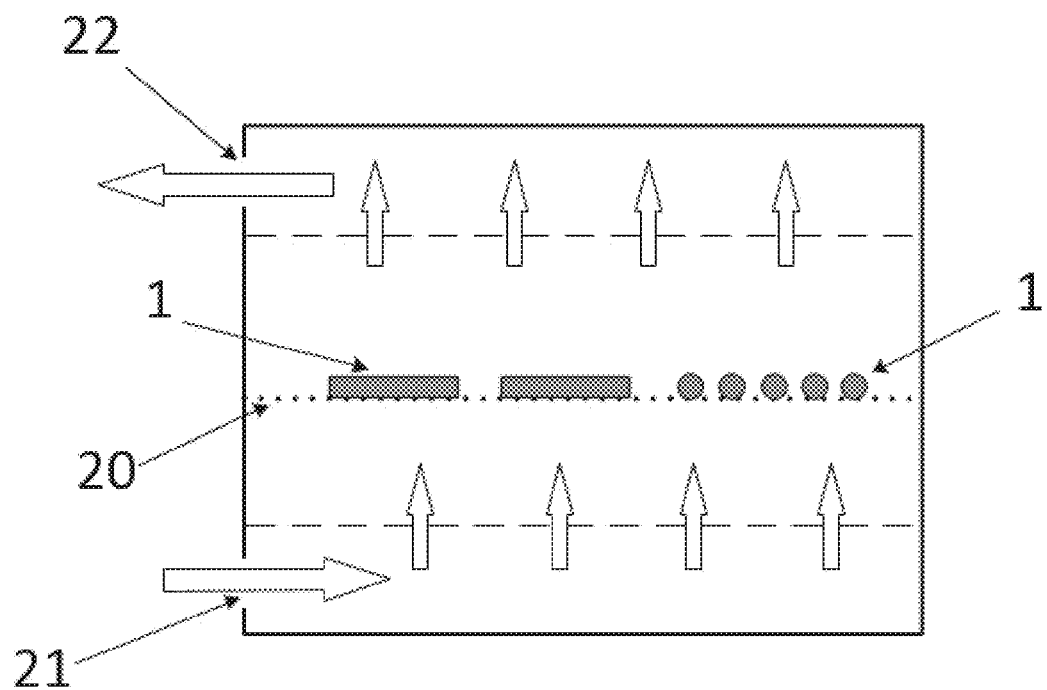
FIG. 14 is an illustration of a cooling device comprising an air stream and a holder.

In FIG. 14 is shown an embodiment, where the apparatus for freezing a biological material comprises an inlet 21 and an outlet 22 for cold air. The stream of air is directed such that it flows from beneath a holder 20 and past the holder 20.

In an embodiment, with reference to FIG. 14, the stream of air exerts enough force on the containers 1 on the holder 20 that the containers are pushed off the holder.

In an embodiment, with reference to FIG. 14, the cooling power is regulated by changing the temperature of the streaming air.

In an embodiment, with reference to FIG. 14, the holder 20 has holes in it.

In an embodiment, with reference to FIG. 14, the holder 20 is a mesh.

In an embodiment, with reference to FIG. 14, the mesh is made of a metal.

In an embodiment, with reference to FIG. 14, the mesh is made of a composite material.

In an embodiment, with reference to FIG. 14, the apparatus is operated in a batch mode.

In an embodiment, with reference to FIG. 14, the apparatus is operated in a continuous mode.

In an embodiment, with reference to FIGS. 2 and 3, the first plate member 2 comprises a magnetic field generating means.

In an embodiment, with reference to FIGS. 4-7, the second plate member 7 comprises a magnetic field generating means.

In an embodiment the magnetic field generating means are permanent magnets.

In another embodiment the magnetic field generating means is an electromagnet.

The magnetic field may be produced by assembling an array of NdFeB block permanent magnets, such as 12 or 24 block permanent magnets.

In an embodiment the permanent magnets each have a magnetic field strength between 0.0001 and 1.0 T, such as between 0.01 and 1.0 T or preferably between 0.0001-0.1 T.

In an embodiment, with reference to FIGS. 4-7, the first plate member 2 and/or the second plate member 7 comprises an electric field generating means.

In an embodiments, the apparatus comprises a pulsing electric field generating means.

The electric field may be generated from two devices including a pulsed power supply and an electrode pair, which converts the pulsed voltage into pulsed electric fields. A parallel plate capacitor arrangement comprising two aluminium plates directly connected to a functional voltage supply produce a uniform field in the volume between the plates. The gap between the two plates may be filled with air of relative permittivity of one and with zero conductivity.

The pulsed electric field may be a square pulse waveform.

In some embodiments, the pulsing electric field generating means have a strength in the range of 0.1-100 V/cm, such as between 0.5-2.2 V/cm.

In some embodiments, the pulsing electric field generating means have a pulsing frequency in the range of 1-1000 kHz, such as in the range of 5 and 100 kHz.

In some embodiments, the apparatus comprise both a pulsing electric field generating means and a magnetic field generating means.

In some embodiments, the orientation of magnetic field and electric pulsing field are parallel.

In an embodiment, with reference to FIGS. 4-7, the first plate member 2 and/or the second plate member 7 are made of a non-magnetic material.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

EXAMPLES

Example 1

Example 1 shows the effect of changes in the duration of ice-formation time for cryopreservation of human cells of the two established cancer cell lines T-47D and T98G in presence or absence of 5% DMSO and in presence or absence of overlapping static magnetic- pulsing electric fields.

The objective was to test the importance of the duration of ice-formation time (=time to remove latent heat during ice formation) of seed stocks of two established human cells lines: T-47D breast cancer cells and T98G glioblastoma cells, for viability after thawing. In addition to variation in ice-forming time two variables have been tested:

Cells frozen without DMSO or with 5% DMSO

Cells frozen within a mixed strong magnetic (0.2-0.3 T)—pulsing electric (20V (220V/m)—20 kHZ) field (hereinafter termed "Strong MAG/PEF"), or just outside the Field Box in a weak magnetic (0.005-0.008 T)—pulsing electric (7-16V (75-185V/m)—20 kHz) (hereinafter "Weak MAG/PEF) field.

The experiment aimed to determine the influence of reduced ice-formation times down to 3 min and in addition determine the probability that a strong or weak magnetic—pulsing electric field and/or the presence or absence of DMSO influence on the fraction of cells retaining their full proliferative capacity after freezing.

The cells of both types were grown as monolayer cultures in RPMI 1640 medium (Gibco, Rockwill, Md., USA) supplemented with 10% fetal calf serum (Gibco), 2 mM L-glutamine, 200 units/I insulin and 1% penicillin/streptomycin (Gibco). The cells were routinely kept in continuous exponential growth by re-culturing twice per week. Harvest for re-culturing or for freezing was done by removing the growth medium, rinsing 2 times in 1.5 ml trypsin EDTA solution (0.05% and 0.02% respectively), and incubating cultures for 5 min at 37° C. in the residual trypsin solution.

A total of $10^8$ cells of each cell line were produced prior to the experiment. Cells were prepared for the experiment by re-culturing from several working stocks on Day 0 and cells were frozen on Day 3.

For each cell type separate preparation of samples for freezing was performed by standard trypsin treatment of several flasks and pooling of the cells after removal of the trypsin solution and re-suspending of the cells in RPMI-medium. After pooling the cell numbers per ml were accurately counted on a flow cytometer and thereafter dilutions of cell suspensions suitable to obtain the concentration of cells desired for transfer to the cryo-tubes were made for each cell type. The final amount of suspension in each cryo-tube was 1 ml. To obtain this amount 0.5 ml of the cell suspension was added and then 0.5 ml of either RPMI or of RPMI supplemented with 10% DMSO was added (so that the final concentration of DMSO was 5% in samples containing DMSO On Day 4 samples indicated by seed numbers 200, 300, 1000 or 5000 per 25 $cm^2$ flask were thawed and cells seeded for colony formation. There were 5 parallel flasks for each sample tested. One control was the traditional procedure used in the laboratory with 5% DMSO and with 30 min in −20° C., 45 min in ~−80° C. and final storage in liquid $N_2$. Another control was samples kept at +20° C. with no freezing.

The flasks were incubated for colony formation in a Steri-cult 200 incubator operated at 37° C. and with an atmospheric concentration of $CO_2$ of 5%. Incubation continued for between 10 and 17 days depending on the growth rate of the cells (T-47D cells have longer cell-cycle duration than T98G-cells). For counting of macroscopic colonies cells were fixed in ethanol and stained with methylene blue. To illustrate differences in appearance after completed incubation some flasks were taken to a scanner for production of photographs of stained colonies.

The results are presented in table 1 below.

For cells cryopreserved without DMSO the plating efficiency for both T-47D cells and T-98G cells were comparable with standard freezing with DMSO at an ice-formation time of 3 minutes in both strong and weak magnetic field with pulsing electric field. With no magnetic and pulsed electric field, the plating efficiency for both are less favorable than in the presence of magnet and/or pulsing electric fields.

TABLE 1

Ice formation time versus plating efficiency - PE (%):

| | | Time, min | | | | | | | | | |
|---|---|---|---|---|---|---|---|---|---|---|---|
| Cell type | MAG-PEF | 1.0 | 1.3 | 2.1 | 3 | 3.2 | 4 | 5.6 | 8 | No freezing | Standard freezing with 5% DMSO |
| | | | | | Plating efficiency - PE (%) | | | | | | |
| T-47D | **weak | | | | 83.2 | | 13.4 | 2.1 | 0.7 | | 80-90 |
| T-47D | *strong | | | | 78.6 | | 12 | | 0.72 | | |
| T-47D | non | 3 | 8 | 9 | 23 | | | | | 75 | |
| T-98G | **weak | | | | 53 | | | 0.08 | | | 57 |
| T-98G | *strong | | | | 49 | | | | | | |
| T-98G | non | 3.8 | 4 | 5.2 | 2,1 | | | | | 31 | |

*) strong magnetic (0.2-0.3 T)—pulsing electric (220V/m): "Strong MAG/PEF"

**) weak magnetic (0.005-0.008 T)—pulsing electric (75-185V/m)—20 kHz) (hereinafter "Weak MAG/PEF) field

Example 2

Example 2 shows the effect of changes in the duration of ice-formation time for cryopreservation of adherent CHO cells in presence or absence of 5% DMSO and in presence or absence of overlapping static magnetic- pulsing electric fields.

The objective was to test the importance of the duration of ice-formation (=time to remove latent heat during ice formation) of seed stocks of adherent CHO cells (chinese hamster ovary cells K1 for viability after thawing. In addition to variation in ice-forming time two variables have been tested:

Cells frozen without DMSO or with 5% DMSO

Cells frozen within a mixed strong magnetic (0.2-0.3 T)—pulsing electric (20V (220V/m)—20 kHZ) field (hereinafter termed "Strong MAG/PEF"), or just outside the Field Box in a weak magnetic (0.005-0.008 T)—pulsing electric (7-16V (75-185V/m)—20 kHz) (hereinafter "Weak MAG/PEF") field.

The experiment aimed to determine the influence of reduced ice-formation times down to 2 min and in addition determine the probability that a strong or weak magnetic—pulsing electric field and/or the presence or absence of DMSO influence on the fraction of cells retaining their full proliferative capacity after freezing.

The cells were grown in 162 cm$^2$ flasks as monolayer cultures in Ham's F12 medium supplemented with 10% fetal calf serum. The cells were kept in continuous exponential growth by re-culturing twice per week. Harvest for re-culturing or for freezing was done by removing the growth medium, rinsing two times in 1.5 ml trypsin EDTA solution (0.05% and 0.02% respectively), and incubating cultures for 5 min at 37° C. in the residual trypsin solution. The trypsinization was stopped by adding Ham's F12 medium with FBS.

Cells were resuspended and counted using Countess Automated Cell counter with Trypan Blue Stain (0.4%) to estimate the cell viability.

The cell suspension was transferred to 15 ml tube and centrifuged (200 g, 5 min, 4° C.). The supernatant was removed and the cell pellets were resuspended in cold FBS to give a final concentration of 2×10$^6$ cells/ml. 0.5 ml of the cell suspension was transferred to 2 ml cryo-tube. Equal volume (0.5 ml) freezing medium with or without DMSO-medium was added to each cryotube to give a final 5% concentration of DMSO and 1×10$^6$ cells per ml in each tube.

After 10 days in liquid nitrogen samples were thawed and cells seeded for colony formation. There were 3 parallel flasks for each sample tested. The control was the traditional procedure used in the laboratory with 5% DMSO and with 30 min in −20° C., 45 min in ~−80° C. and final storage in liquid N$_2$.

The flasks were incubated for colony formation in a Steri-cult 200 incubator operated at 37° C. and with 5% CO$_2$ in the atmosphere. Incubation continued for six days. For counting of macroscopic colonies cells were fixed in ethanol and stained with methylene blue.

The results of the experiment are shown in table 2 and 3.

TABLE 2

Ice formation time and plating efficiency, without DMSO

| Ice formation time (min, sec) | +: Strong MAG/PEF *) −: Weak MAG/PEF **) | PE: plating efficiency (%) |
|---|---|---|
| 1 min 55 sec | + | 83 |
| | − | 78 |
| 4 min 8 sec | + | 26 |
| | − | 52 |
| 5 min 7 sec | + | 07 |
| | − | 37 |

TABLE 3

Ice formation time and plating efficiency, with DMSO

| Ice formation time (min, sec) | +: Strong MAG/PEF *) −: Weak MAG/PEF **) | PE: plating efficiency (%) |
|---|---|---|
| 1 min 55 sec | + | 88 |
| | − | 98 |
| 4 min 8 sec | + | 107 (artefacted) |
| | − | 95 |
| 5 min 7 sec | + | 72 |
| | − | 64 |

*) strong magnetic (0.2-0.3 T) – pulsing electric ((220 V/m): "Strong MAG/PEF"
**) weak magnetic (0.005-0.008 T) – pulsing electric ((75-185 V/m) – 20 kHz) (hereinafter "Weak MAG/PEF) field.

The experiment shows that in a combined static magnetic field and pulsed electric field the viability of DMSO-free cryopreserved CHO cells after thawing is comparable with conventional cryopreserved CHO cells with DMSO when the ice-formation time is short, and that the viability is reduced for longer ice-formation times for both DMSO-free cryopreserved cells and for cells frozen with DMSO Example 3

The objective was to test whether it is possible to maintain blood platelets non-activated and functionally intact in PRP when frozen with short latent heat removal times, and whether the presence of magnetic fields and/or pulsing electric fields influence on the result.

Blood (2.7 mL) was drawn into 0.109M citrate anticoagulant (0.3 mL /tube) in tubes that successively were centrifuged at 200×g in 12 min. at +20° C. to yield supernatants with platelet-rich plasma (PRP) in volumes of about 1.2 mL/tube.

From each tube 1.0 mL PRP was carefully pipetted into 20 separate cryo-tubes that were sealed and used in freezing experiments. The PRP samples were stored at +20° C. for 20 hours until the freezing processes were initiated. Two samples were kept as controls at +20° C. with no freezing.

Freezing was performed in two samples per test conditions, and the freezing conditions were varied as follows:

Latent heat removal time: 2; 3.5; 4; 5 and 6 minutes

Pulsing field: Presence or absence pulsing electric field 220V/m-20 KHz; or 75-185V/m-20 KHz.

Magnetic field: Presence or absence of static, magnetic field 0.2-0.3 T or 0.005-0.008 T.

All samples were allowed to freeze to −70° C. and kept at this temperature for 24 hours and then thawed at +20° C. The PRP samples were inspected for platelet aggregates. None of the PRP-samples, whatever conditions used for freezing, as well as the controls that were not frozen, showed any sign of aggregates proving that the platelets were not activated during the process. Thereafter one of the two sets of PRP were added 1 U human thrombin to each tube which in all the tubes caused an immediate platelet aggregation followed by coagulation of the plasma, showing that the platelet aggregation response was active intact after the freezing processes. Some of the samples from the other set of PRP were transferred to glass tubes and added CaCl$_2$ to a concentration over that of citrate in the samples. After some minutes platelet aggregates formed, also showing that the aggregations response was intact.

After the aggregation experiment the PRP was subjected to centrifugation at 200×g for 10 minutes to remove any aggregates and leaving any non-aggregated platelet in the supernatant. As measured at 620 nm in a spectrophotometer against proper controls, no non-aggregated platelets were detectable proving that the aggregation was complete.

The experiment shows that it is possible to maintain blood platelets non-activated and functionally intact in PRP frozen with short latent heat removal time, and that the presence of magnetic fields and/or pulsing electric fields did not influence on the result.

Example 4

The objective was to test lysis of erythrocytes after freezing with short latent heat removal time and thawing.

Eight blood samples of 3.5 mL each where drawn from a healthy, non-medicated male individual into Vacuette $K_2$EDTA tubes. Two tubes where stored at +20° C. and used for control. The other tubes where positioned adjacent to tubes containing 0.9% NaCl in the freezing apparatus. The tubes containing 0.9% NaCl were equipped with temperature sensors allowing to measure the process of removal of latent heat from the liquid. It is assumed that the removal of latent heat from the 0.9% NaCl-solutions is identical or close to identical to the removal of latent heat from the close standing blood samples. Two blood samples were allowed to freeze in a process where latent heat from ice-formation was removed over a time interval of 2 min. Two other samples were allowed to freeze in a process where latent heat from ice-formation was removed over a time interval of 2 min. 29 sec., whereas the last two blood samples were allowed to freeze is a process where latent heat from ice-formation was removed over a time interval of 4 min. 23 sec. The temperature was successively allowed to drop to −70° C. The blood samples were stored under such conditions for 24 hours before taken out and thawed at +20° C. After the samples had reached +20° C., they were subjected to centrifugation at 2000×g for 15 min. in order to spin down the erythrocyte fraction and leaving a plasma supernatant for further inspection. The plasma fractions where subsequently split into two parallels and transferred to cuvettes and measured at 550 nm using the plasma from the untreated blood samples as a control. If lysis of erythrocytes had occurred, hemoglobin absorbing light at 550 nm would be measurable in the plasma.

Table 4 shows the results of the experiment, proving that short latent heat removal time did not affect the lysis of erythrocytes under the given conditions.

TABLE 4

| Sample ID | Latent heat removal time | Hemoglobin in plasma supernatant, g/dL | % lysis* |
|---|---|---|---|
| A1 | Control | 0.1 | 0.7 |
| A2 | Control | 0 | 0 |
| a1 | Control | 0 | 0 |
| a2 | Control | 0 | 0 |
| B1 | 2.0 min | 0.3 | 2 |
| B2 | 2.0 min | 0.3 | 2 |
| b1 | 2.0 min | 0.6 | 4 |
| b2 | 2.0 min | 0.6 | 4 |
| C1 | 2 min 29 sec | 0 | 0 |
| C1 | 2 min 29 sec | 0.1 | 0.7 |
| c1 | 2 min 29 sec | 0.1 | 0.7 |
| c2 | 2 min 29 sec | 0.1 | 0.7 |
| D1 | 3 min 36 sec | 0 | 0 |
| D2 | 3 min 36 sec | 0 | 0 |
| d1 | 3 min 36 sec | 0 | 0 |
| d2 | 3 min 36 sec | 0 | 0 |

*Hb in test person: 15 g/dL

Example 5

The objective was to test the stability of platelets counts after freezing with short latent heat removal time and thawing.

Eight blood samples of 3.5 mL each were drawn from a healthy, non-medicated male individual into Vacuette $K_2$EDTA tubes. Two tubes where stored at +20° C. and used for control. The other tubes where positioned adjacent to tubes containing 0.9% NaCl in the freezing apparatus. The tubes containing 0.9% NaCl were equipped with temperature sensors allowing to measure the process of removal of latent heat from the liquid. It is assumed that the removal of latent heat from the 0.9% NaCl-solutions is identical or close to identical to the removal of latent heat from the close standing blood samples. The other six blood samples were allowed to freeze in a process where latent heat from ice-formation was removed over time intervals of 1 min. 30 sec. (two samples), 2 min. 54 sec. (two samples), and 3 min. 40 sec (two samples), respectively. The temperature was successively allowed to drop to −70° C. The blood samples were stored under such conditions for 48 hours before taken out and thawed at +20° C. After the samples had reached +20° C., they were subjected to measurement and platelet content by impedance methodology.

Table 5 shows the platelet counts in samples of blood anticoagulated with EDTA after freezing at various time intervals of removal of latent heat, thawing and measurement with impedance technology results. The result prove that the platelets counts remain stable after the freezing and thawing process using short periods of time for removal of latent heat during freezing.

TABLE 5

Platelet counts

| Sample- ID | Unit platelet count | Measurement 1 | Measurement 2 | Average | % of control |
|---|---|---|---|---|---|
| Control 1 | ×10⁹/L | 188 | 195 | 192 | — |
| Control 2 | ×10⁹/L | 187 | 190 | 189 | — |
| Freeze 1-P1 | ×10⁹/L | 181 | 183 | 182 | 96 |
| Freeze 1-P1 | ×10⁹/L | 185 | 174 | 180 | 95 |
| Freeze 2-P1 | ×10⁹/L | 191 | 186 | 189 | 99 |
| Freeze 2-P1 | ×10⁹/L | 194 | 176 | 185 | 97 |
| Freeze 3-P1 | ×10⁹/L | 190 | 187 | 189 | 99 |
| Freeze 3-P1 | ×10⁹/L | 192 | 185 | 189 | 99 |

Reference interval B-Thrombocytes/platelets, mean: 145 348 × 10⁹/L

Example 6

A apparatus for applying static magnetic fields and/or electric fields during freezing of biological material according to the present invention was produced. The apparatus, also referred to as field box, was used in the freezing procedure of the previous examples.

Figure 15A:
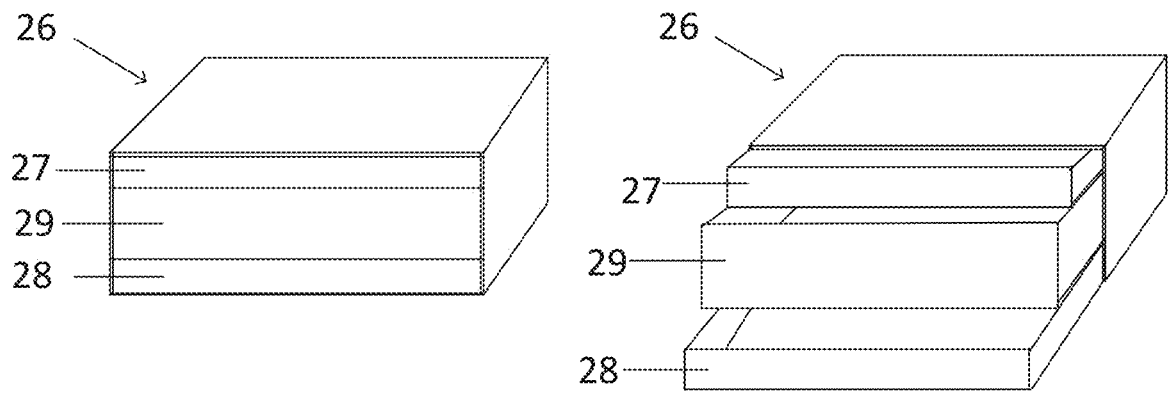
FIG. 15A is an illustration of a field box according to an embodiment of the present invention.

A field box was built from materials with low or no magnetic permeability in nature (aluminum, plastic or mica), with dimensions of 40 cm×30 cm×20 cm and three different compartments. A top and a bottom drawer: 40 cm×30 cm×5, are used as holders for magnets, whereas the middle part is a 40 cm×30 cm×10 cm treatment chamber, in which samples can be placed in suitable racks to be exposed to pulsed electric and/or uniform static magnetic fields. Reference is made to FIG. 15A illustrating an embodiment of the field box.

The rack in which the freezing procedure could be monitored (i.e. controlling time for removal of latent heat during ice-formation) was made by 1) an aluminium box sized 40 cm×30 cm×10 cm open in two ends, and 2) an aluminium rack where the top surface contained 36 holes of standard cryo-tube type diameter, 3). Furthermore, two fans (diameter 11 cm from tip to tip, 230V AC/0.12 A) was mounted at one end generating an air flow up to 8 m/s (as measured at room temperature), mounted in a square holder of 12 cm×12 cm, and 3.8 cm thick, with max frequency of 2700 rpm, max airflow of 2.66 $m^3$/min.

At different positions in the rack, cryotubes containing 0.9% NaCl was placed containing temperature sensors to allow monitor of the freezing process by connection to a recording instruments. It was assumed that the ice-formation and the process of removal of latent heat monitored in the NaCl corresponded to the freezing process in close positioned samples containing cell suspension to be tested for viability after freezing. The rack was placed in a freezer with the cables from the temperature sensor stretching outside to the recording units. By varying the air-flow through the rack, different time intervals for removal of latent heat during ice-formation could be generated.

The rack was designed to fit into the field box. At the opposite end of the fans, a sleeve was mounted with capacity of a sample rack with up to 16 samples in an environment that be positioned outside the Field Box. The two sample racks were perfectly connected to facilitate the positioning of samples to MAG/PEF-field and control field (=no MAG/PEF field) in one operation.

Figure 16A:
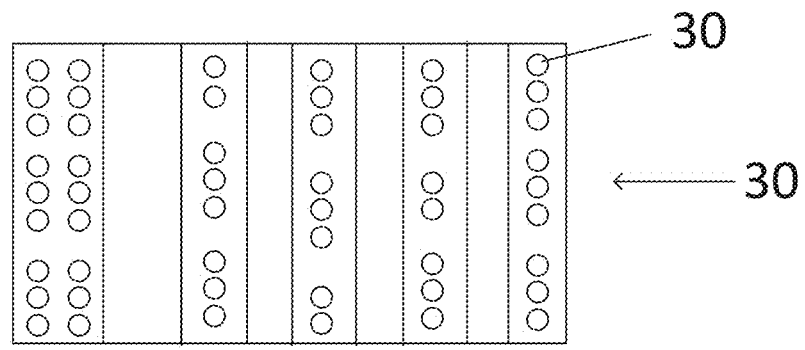
FIG. 16A is an illustration of a sample rack to be used in the apparatus according to an embodiment of the present invention.
Figure 16B:
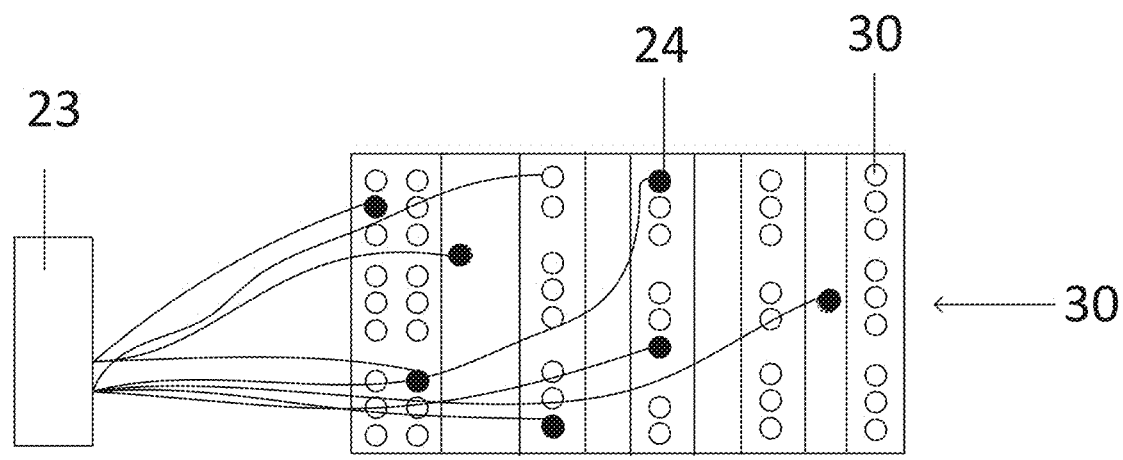
FIG. 16B is an illustration of the sample rack in FIG. 16A where temperature sensors are placed to be used in the apparatus according to an embodiment of the present invention.

Reference is made to FIG. 16A, illustrating a sample rack according to an embodiment of the present invention. In FIG. 16B, temperature sensors are placed within the holes, e.g in the liquid samples. Furthermore, two sensors are placed "naked", i.e. outside of the cryo tubes, in the airstream. The temperature sensors are all connected to a control system.

Figure 15B:
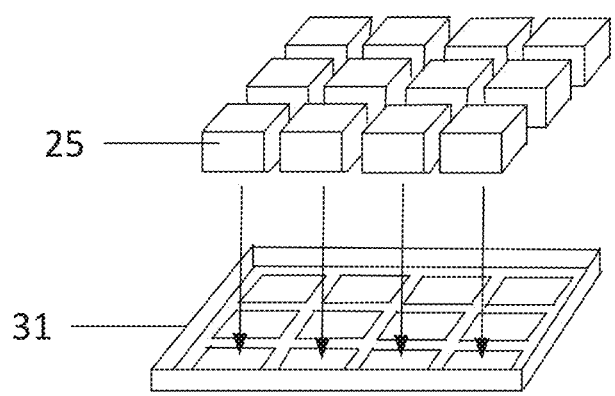
FIG. 15B is an illustration of a magnet holder according to an embodiment of the present invention.

In addition, two boxes of 30 cm×20 cm×2.55 cm were used for assembling and packing the magnets for subsequent placing in the drawer boxes. These boxes were made from a 2 cm strong plastic frame with a bottom of 1.5 cm waterproof wood and a top of a 0.6 cm plastic mica sheet cover. In the wood 12 identical 5.1 cm×5.1 cm×0.3 cm spaces were made. These were used for attaching thin metal plates (screwed to the bottom wood) in order to keep the magnets in place. Reference is made to FIG. 15B illustrating an embodiment of the magnet holder.

A pulsed electric field (PEF) was created from two devices: a pulsed power supply and an electrode pair, which converted the pulsed voltage into PEFs. A parallel plate capacitor arrangement comprising two aluminium plates of 40 cm×30 cm directly connected to a functional voltage supply produced a uniform field in the volume between the plates. The gap between the two plates is filled with air of relative permittivity of one and with zero conductivity. The pulsed electric field was a square pulse waveform. Two parallel area aluminium plate capacitors separated by 10 cm and connected to a power supply.

The static magnetic field was produced in this field box by assembling 24 NdFeB block permanent magnets (each having a surface field of 0.42 T). 12 magnets were arranged in the top drawer and in the bottom drawer. Each block magnet had dimensions of 5.08 cm×5.08 cm×2.54 cm with spacings of 2.0-2.5 cm.

Simulation was performed for both the pulsed electric field and the static magnetic field, in order to show and verify the field distribution and strength, using COMSOL Multiphysics ver. 5.0. a simulation software package for various physics and engineering applications. The software was based on the finite element method (FEM), a numerical technique in mathematics for calculating approximate solutions of partial differential equations (PDEs) with known boundary conditions. Here the partial differential equation form of Maxwell equations of electromagnetic phenomena could be solved numerically using the software.

Figure 17:
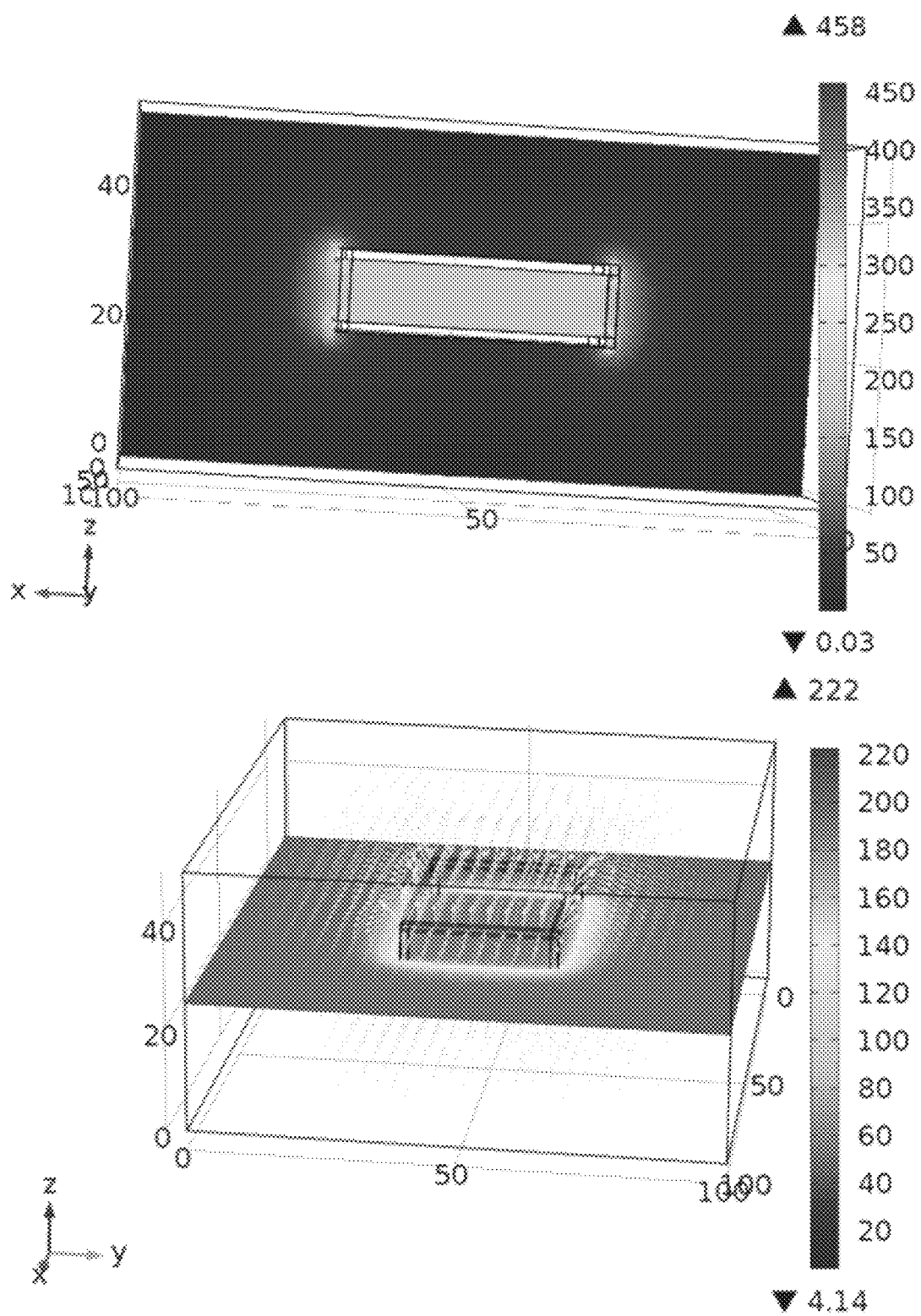
FIG. 17 illustrates the distribution of pulsed electric field for parallel plate capacitor system (COMSOL Multiphysics).
Figure 18:
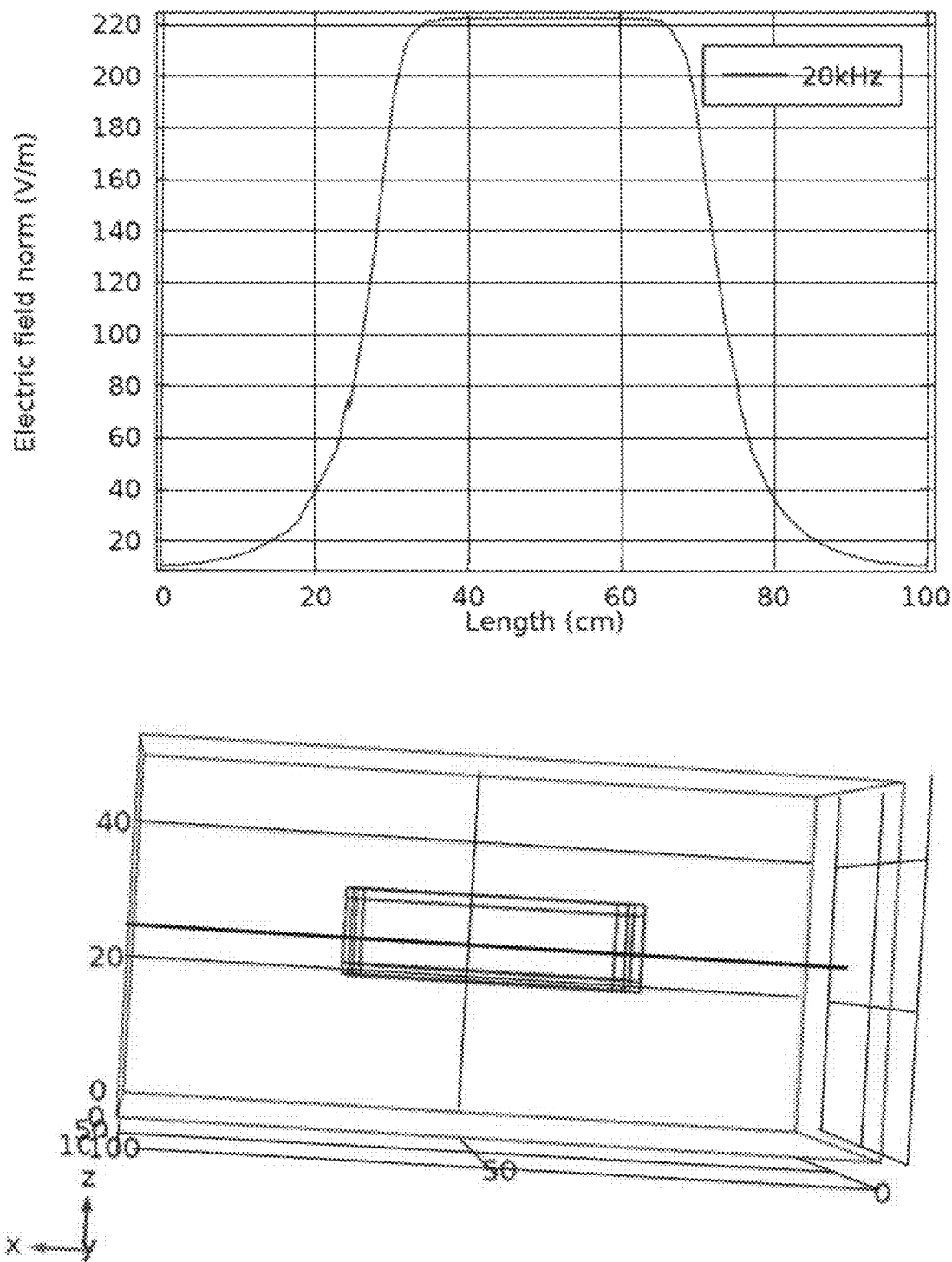
FIG. 18 illustrates the electric field norm across the middle of the parallel plate capacitor system (COMSOL Multiphysics).

The electric field inside and outside the field box horizontally across the middle of the two plates is shown in FIG. 17. The figure shows that the electric field norm is almost constant inside the box and drop significantly and becomes zero when moving away from the box. The electric field norm between the lower plate and the upper plate is also constant as shown in FIG. 5. The figures show that the electric field norm in any direction inside the box is uniform.

The simulation was done using Comsol Multiphysics software (version 5.0) and the results are presented in FIGS. 19 to 24.

Figure 19:
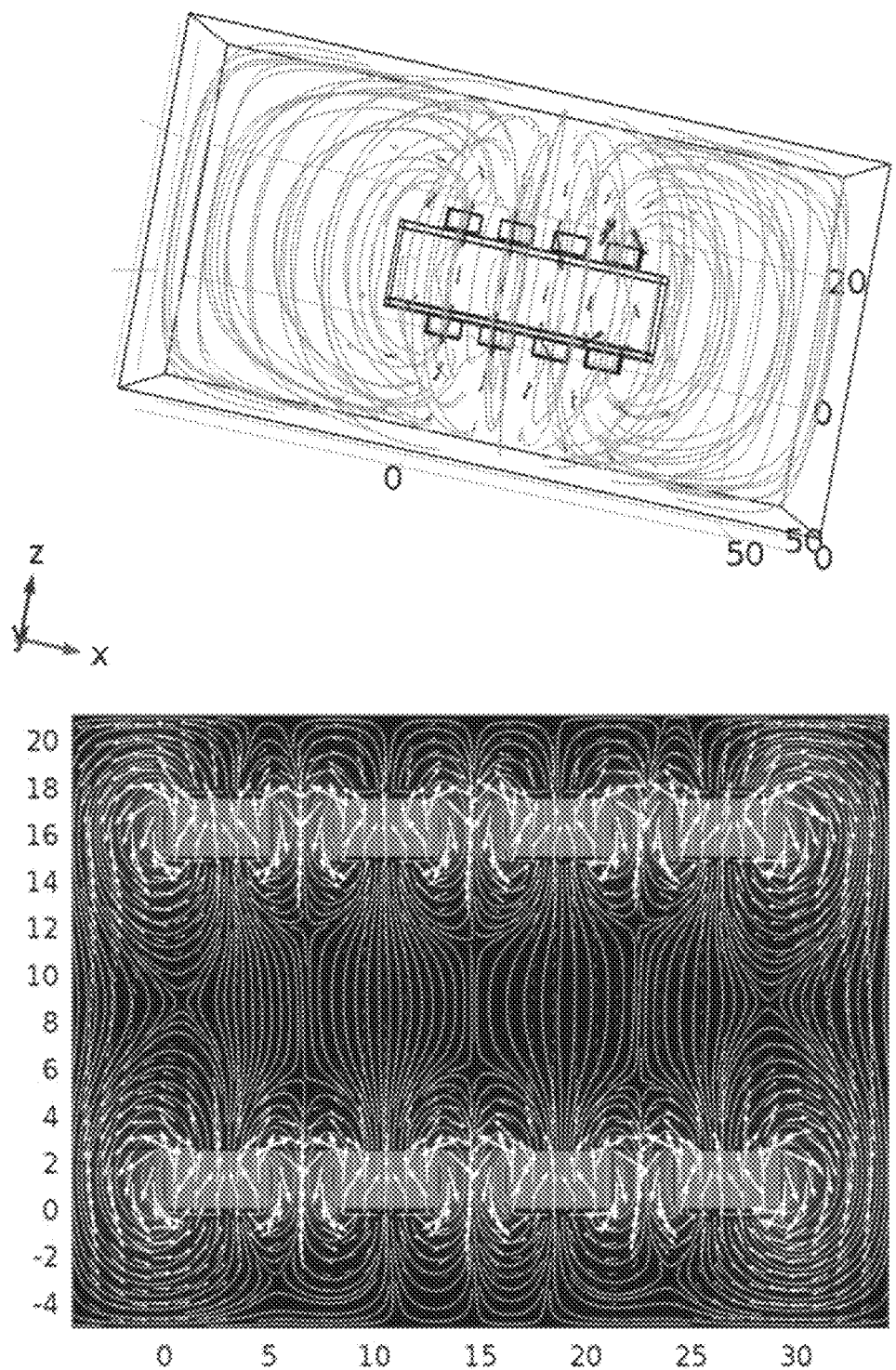
FIG. 19 illustrates the magnetic field norm streaming and magnetic flux density an apparatus according to an embodiment of the present invention.

Reference is made to FIG. 19 illustrating the magnetic field norm streaming and magnetic flux density (4 magnet side).

Figure 20:
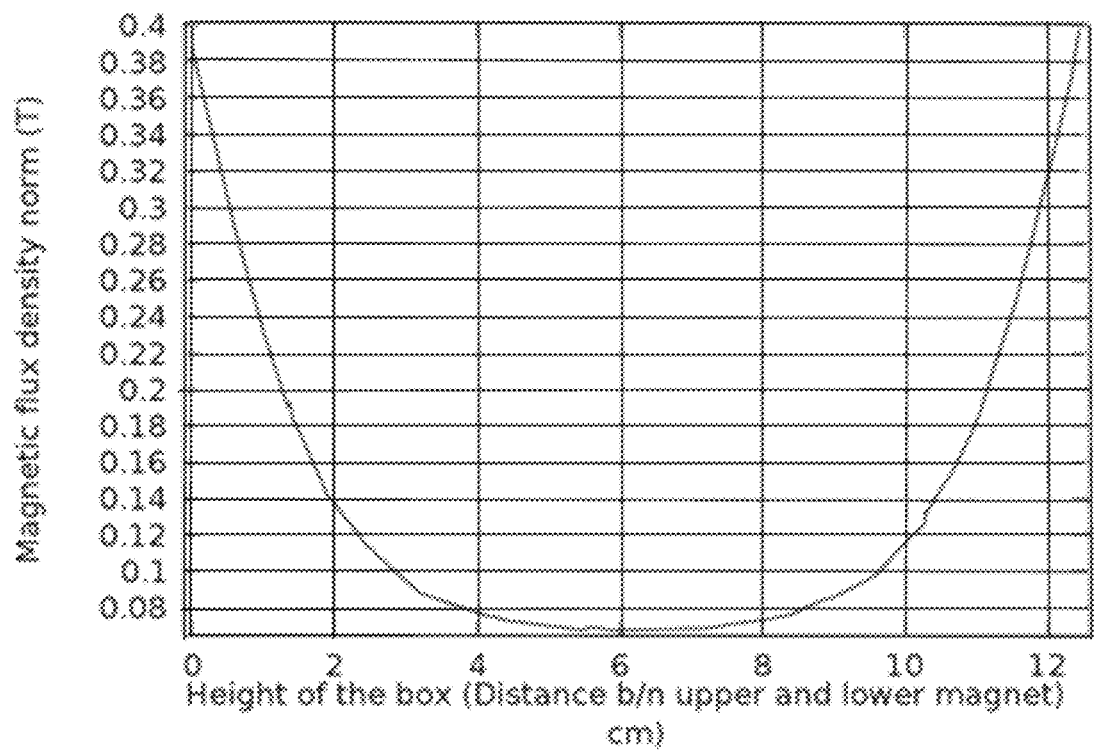
FIG. 20 illustrates the magnetic flux density of an apparatus according to an embodiment of the present invention, from the top surface of lower magnet to bottom surface of the upper magnet in the center of the magnet.
Figure 20:
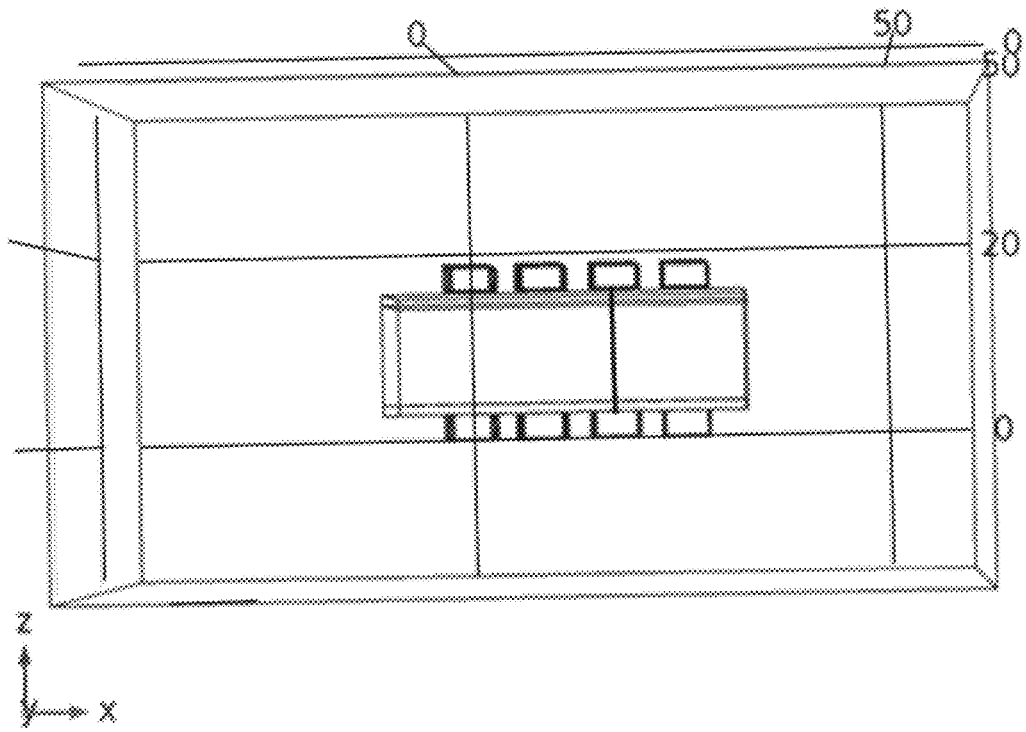
Figure 21:
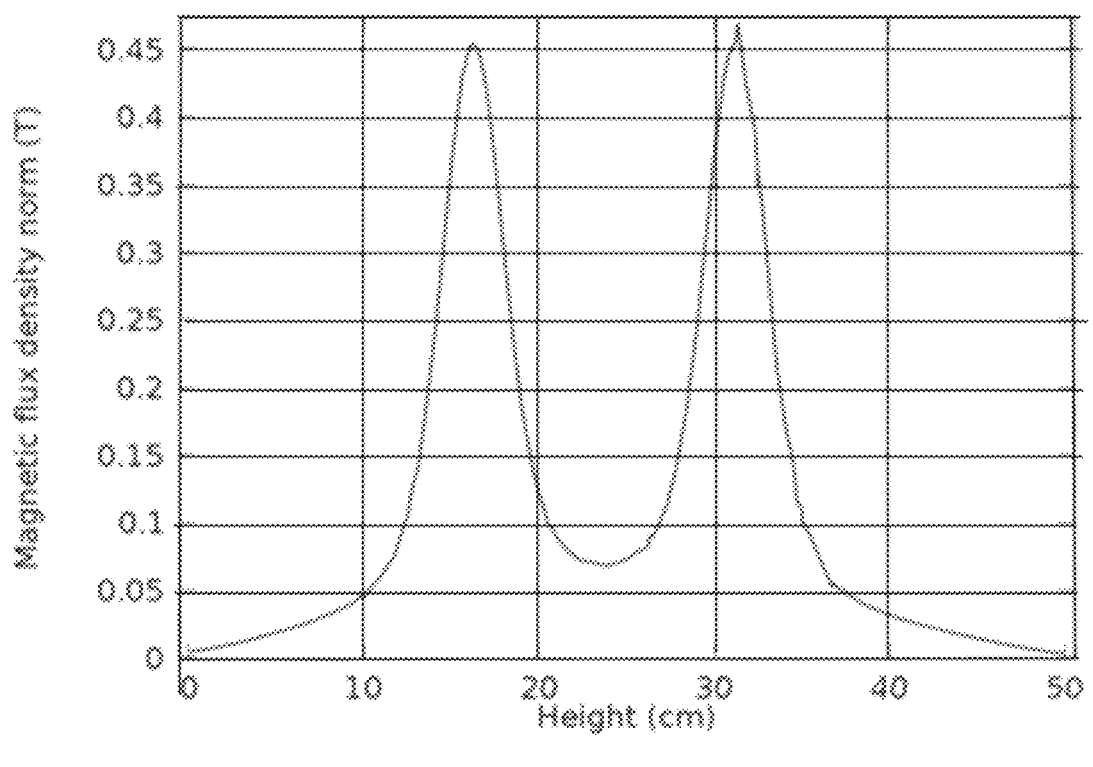
FIG. 21 illustrates the magnetic flux density distribution above, inside and below an apparatus according to an embodiment of the present invention, along the line passing through the centre of the one magnet from each side.
Figure 21:
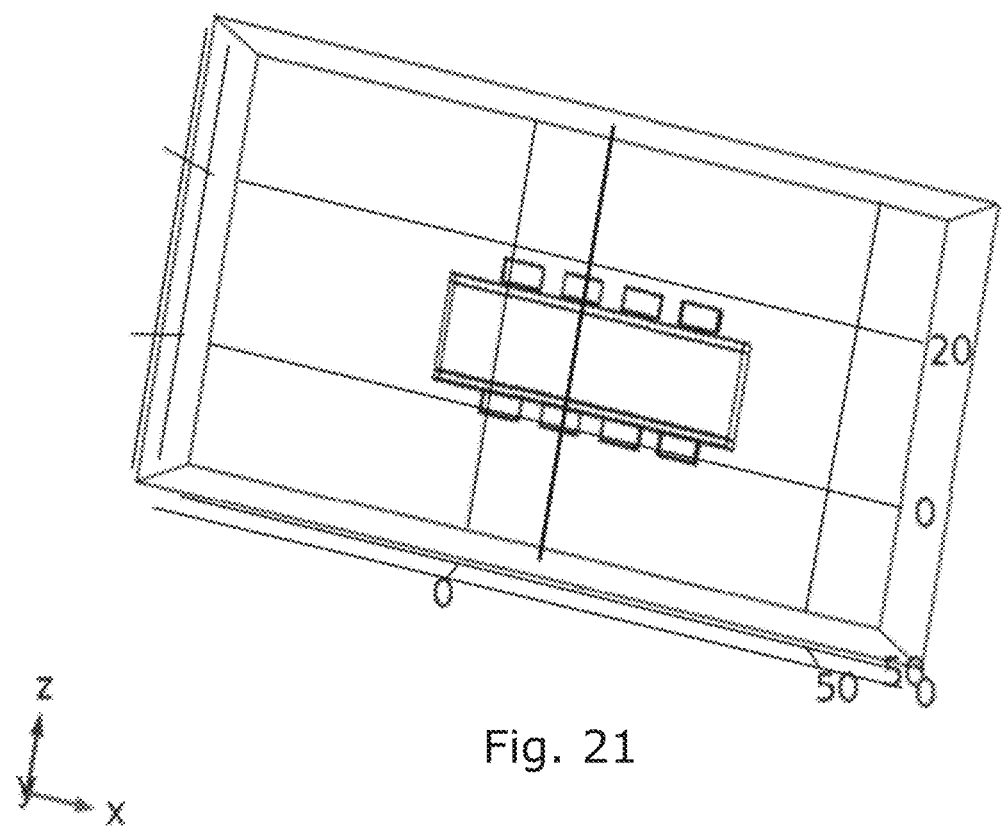

Reference is made to FIG. 20 illustrating the magnetic flux density from the top surface of lower magnet to bottom surface of the upper magnet in the center of the magnet Reference is made to FIG. 21 illustrating the magnetic flux density along the line passing through the centre of the one magnet from each side. This is to show the magnetic flux density distribution above, inside and below the field box.

Figure 22:
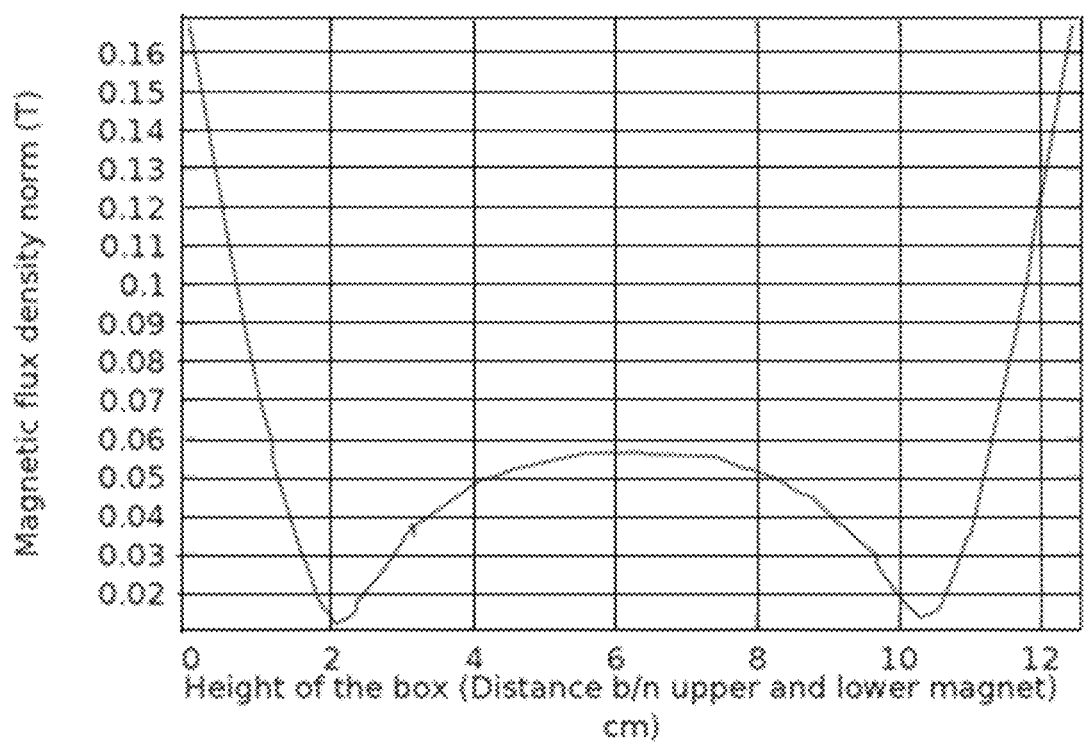
FIG. 22 illustrates the magnetic flux density of an apparatus according to an embodiment of the present invention, from the top surface of lower magnet to bottom surface of the upper magnet at the center of the four-magnet junction.
Figure 22:
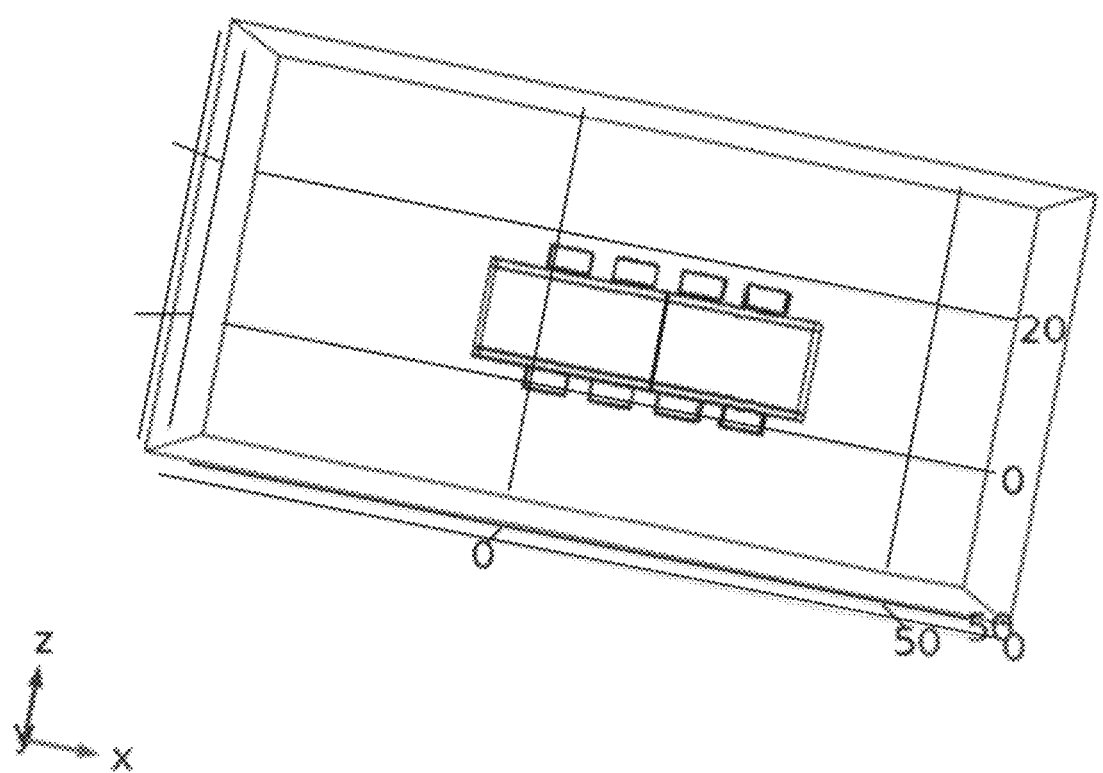
Figure 23:
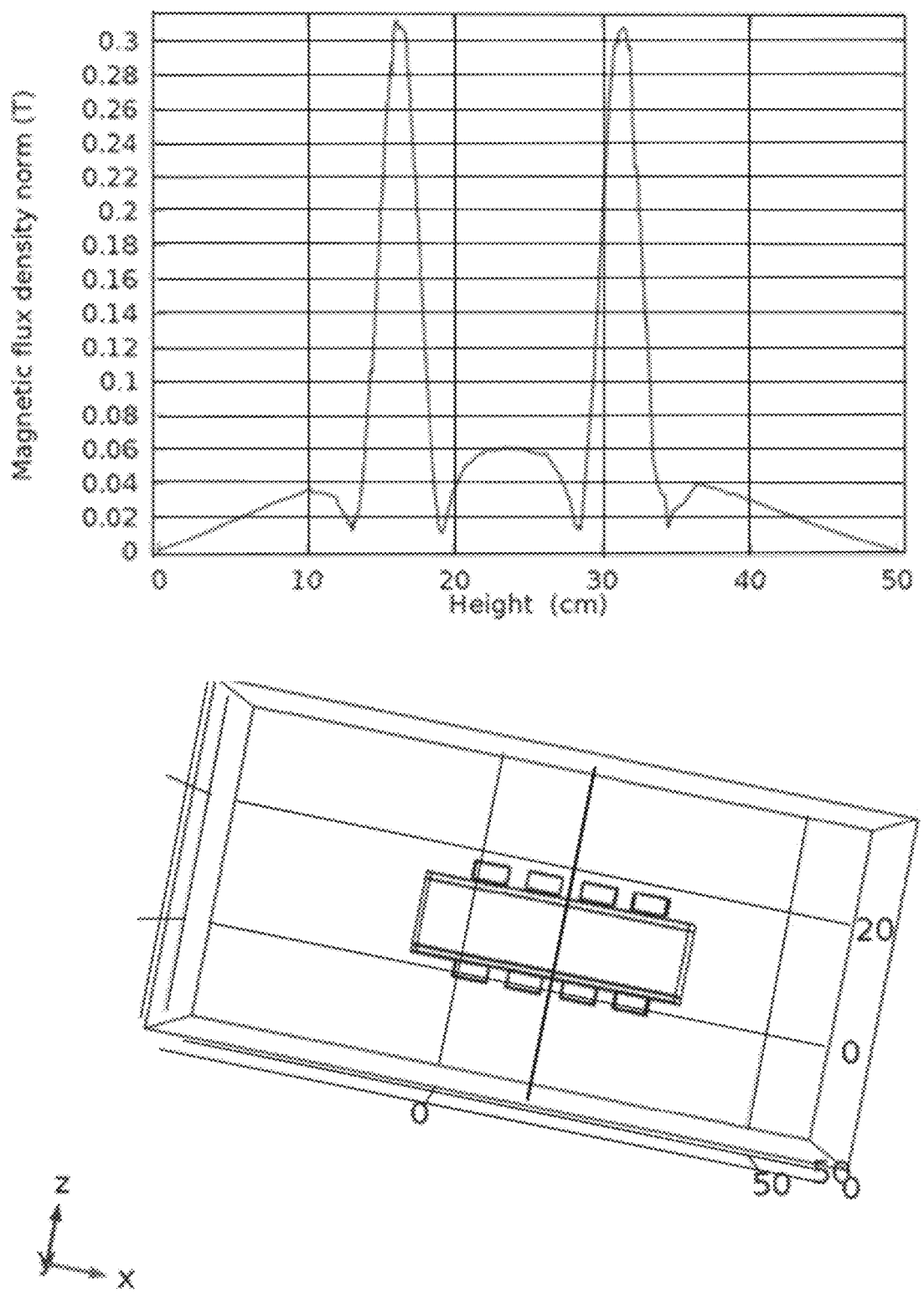
FIG. 23 illustrates the magnetic flux density above, inside and below the apparatus according to an embodiment of the present invention.
Figure 24:
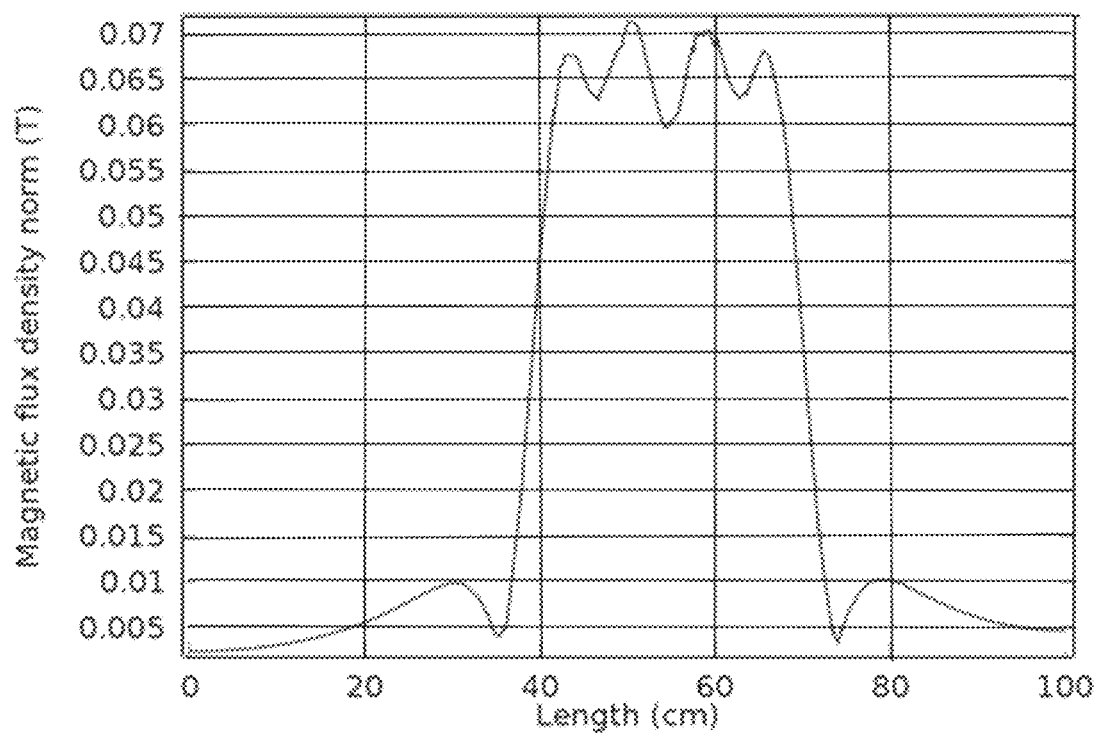
FIG. 24 illustrates the magnitude of the magnetic flux density in the centre of an apparatus according to an embodiment of the present invention.
Figure 24:
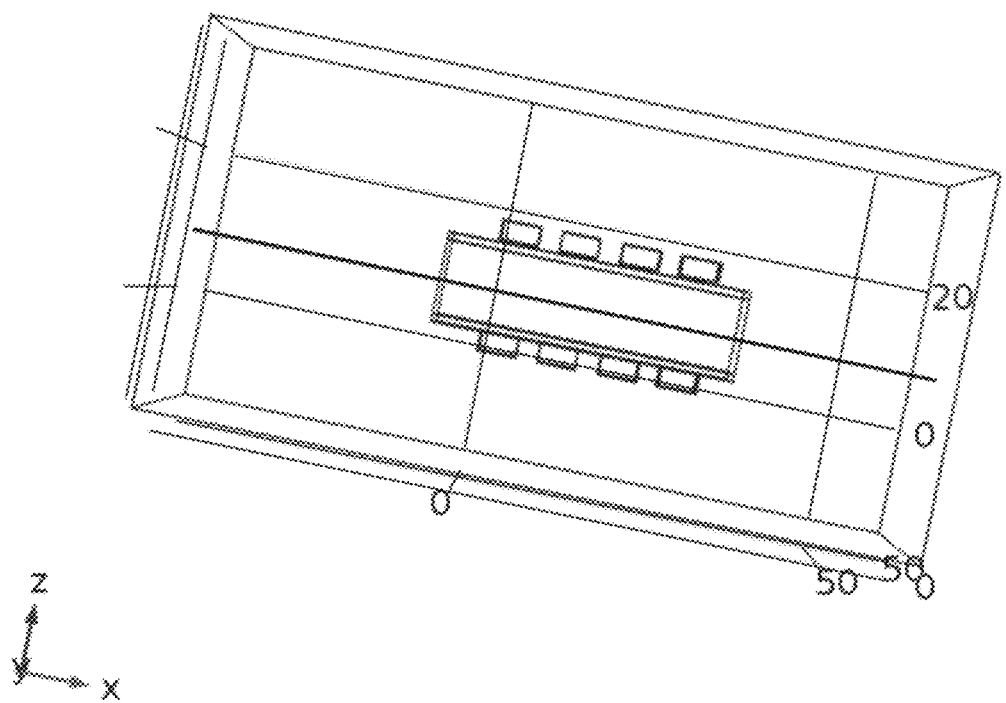

Reference is made to FIG. 22 illustrating the magnetic flux density from the top surface of lower magnet to bottom surface of the upper magnet at the center of the four-magnet junction Reference is made to FIG. 23 illustrating the magnetic flux density along the line passing between two magnets. This is to show the magnetic flux density above, inside and below the field box Reference is made to FIG. 24 illustrating the magnitude of the magnetic flux density along the mid gap between the upper and lower sets of magnet, which is the centre of the field box.

LIST OF REFERENCE SYMBOLS USED

1 Container for biological sample or calibration sample
2 First plate member
3 Construction in thermal contact with plate member
4 Openings for cooling fluid
5 Indentations
6 Hinge
7 Second plate member
8 Closing aggregate
9 Container holder
10 Wind-generating member
11 Calibration sample
12 Biological sample
13 Cooling bath
14 Rotating sample rack/holder
15 Cooling device
16 Thermometer
17 Cooling rod
18 Circulator
19 Stirring member
20 Holder
21 Inlet for air
22 Outlet for air
23 Control system 24 Temperature sensors
25 Magnetic field generating means
26 box
27 top compartment
28 bottom compartment
29 middle compartment
30 sample rack
31 magnet holder

The invention claimed is:

1. A method of freezing human and/or animal cells in suspension, wherein one or more samples of human and/or animal cells in suspension are contained in container(s) including one or more liquids, the method comprising:
controlling cooling capacity in such a manner that the phase transition time of a sample can be regulated and controlled;
determining the cooling needed such that the phase transition time of a calibration sample contained in a container is an any more or less precise length below 6 minutes;
cooling said one or more samples in the same manner as said calibration sample by controlling the amount of cooling, such that that the phase transition time of the sample is regulated to an any more or less precise length below 6 minutes,
wherein less than 2% of cryoprotectant of the total sample volume is added to the container containing the biological material.

2. The method of freezing human and/or animal cells in suspension as claimed in claim 1, wherein the one or more samples are exposed to a magnetic field and/or a pulsing electric field during the finite phase transition time, for a time period of at least 1 minute, such as at least 2 minutes, such as at least 3 minutes, such as at least 4 minutes, such as the whole finite phase transition time.

3. The method of freezing human and/or animal cells in suspension as claimed in claim 2, wherein the strength of the magnetic field is between 0.0001 and 1.0 T.

4. The method of freezing human and/or animal cells in suspension as claimed in claim 2, wherein the strength of the pulsing electric field is between 0.1-100V/cm, and the pulsing frequency is between 1-1000 KHz.

5. The method of freezing human and/or animal cells in suspension as claimed in claim 1, wherein said container does not exceed 100 mm in any dimension, such as does not exceed 50 mm, preferably does not exceed 25 mm.

6. The method of freezing human and/or animal cells in suspension as claimed in claim 1, wherein the cooling of said one or more samples contained in containers comprises:
placing said container in a setup comprising a fan or other wind-generating means, where the wind generated cools the container and the content of the container,
regulating the wind generating means, such as the speed of the generated wind to achieve said cooling.

7. The method of freezing human and/or animal cells in suspension as claimed in claim 1, wherein the cooling of said container comprises:
placing said container in a cooling bath,
regulating the cooling power of the cooling bath by reducing or increasing the temperature of the freezing solution to achieve said cooling.

8. The method of freezing human and/or animal cells in suspension as claimed in claim 1, wherein the cooling of said container comprises:
placing said container on a first plate member,
regulating the cooling of said first plate member to achieve said cooling.

9. The method of freezing human and/or animal cells in suspension as claimed in claim 8 further comprising:
a second plate member closing on said first plate member.

10. The method of freezing human and/or animal cells in suspension as claimed in claim 1, wherein the samples of human and/or animal cells in suspension to be frozen is human cells, animal cells, cell lines, primary cells, stem cells, tissue cells, blood products, embryos, sperm, or fish eggs.

11. An apparatus for freezing samples of human and/or animal cells in suspension according to the method of claim 1, wherein the apparatus comprises a cooling system, wherein the cooling power of said cooling system is controllable such that a time is set, wherein the time set is the duration of latent heat removal from a calibration sample, a first plate member, which can hold a sample of biological material, said first plate member being in thermal contact with said cooling system, a second plate member, wherein said first plate member and said second plate member can move in relation to each other.

12. An apparatus for freezing samples of human and/or animal cells in suspension as claimed in claim 11, wherein
the cooling system includes a wind-generating member configured to cool said samples over a period of time, and
the cooling system is controllable such that said samples are cooled in the same manner as the calibration sample in said step of cooling said one or more samples.

13. An apparatus as claimed in claim 11, further comprising temperature sensors immersed in the calibration sample to determine the cooling needed based on input data from the temperature sensors.

14. An apparatus as claimed in claim 11, wherein the apparatus further comprises a magnetic field generator, configured to expose the one or more samples to a magnetic field strength between 0.0001 T and 1.0 T.

15. An apparatus as claimed in claim 14, wherein the magnetic field generator comprise a plurality of magnets arranged in an array.

16. An apparatus as claimed in claim 11, wherein the apparatus comprises a pulsing electric field generator, configured to expose the one or more samples to a pulsing electric field with a strength in the range of 0.1-100V/cm, and a pulsing frequency in the range of 1-1000 KHz.

17. An apparatus as claimed in claim 16, wherein the pulsing electric field generator includes a pulsed power supply, an electrode pair and a plate capacitor arrangement comprising two parallel spaced aluminium plates.

18. An apparatus as claimed in claim 11, wherein the apparatus comprise a box made from materials with low or no magnetic permeability in nature, such as aluminium, plastic or mica, the box comprising three different compartments, such as drawers, wherein a top compartment and a bottom compartment are configured to hold the magnetic field generator and a middle compartment is configured for holding said samples, as well as the calibration sample.

19. An apparatus as claimed in claim 18, wherein the magnetic field generator includes a plurality of magnets arranged on a magnet holder which can be fitted into the top compartment or bottom compartment comprising a plate with indentations for the magnets.

20. An apparatus as claimed in claim 19, wherein the apparatus further comprises a sample rack comprising holes adapted to hold containers comprising said samples and the calibration sample, such as holes having standard cryo-tube type diameter.

21. An apparatus as claimed in claim 20, wherein the sample rack is adapted to fit into the middle compartment.

22. An apparatus as claimed in claim 11, wherein the first plate member-and/or the second plate member has one or more indentations, where said indentations can hold samples of human and/or animal cells in suspension or a calibration sample.

23. An apparatus as claimed in claim 11, wherein the cooling system comprises a cooling bath.

24. An apparatus as claimed in claim 11, wherein the samples of human and/or animal cells in suspension to be frozen is human cells, animal cells, cell lines, primary cells, stem cells, tissue cells, blood products, embryos, sperm, or fish eggs.

\* \* \* \* \*